US007274375B1

(12) United States Patent
David

(10) Patent No.: US 7,274,375 B1

(45) Date of Patent: Sep. 25, 2007

(54) TIMEKEEPING SYSTEM AND METHOD FOR GRAPHICALLY TRACKING AND REPRESENTING ACTIVITIES

(76) Inventor: Peter David, 3213 Kinross Cir., Herndon, VA (US) 20171

( * ) Notice: Subject to any disclaimer, the term of this patent is extended or adjusted under 35 U.S.C. 154(b) by 571 days.

(21) Appl. No.: 10/298,644

(22) Filed: Nov. 19, 2002

(51) Int. Cl.
*G09G 5/00* (2006.01)
*G06F 3/48* (2006.01)
*H04M 3/00* (2006.01)

(52) U.S. Cl. ...................... 345/619; 345/661; 715/764; 715/859; 713/502; 379/266.06; 379/114.09

(58) Field of Classification Search ........ 345/440-441, 345/764, 771, 772, 581, 589, 619, 661; 715/764, 715/771-772, 700, 859, 860, 844; 379/266.06, 379/266.03, 114.09; 713/500, 502
See application file for complete search history.

(56) References Cited

U.S. PATENT DOCUMENTS

| | | | | |
|---|---|---|---|---|
| 2,785,530 A | | 3/1957 | Mayer | 58/126 |
| 3,608,214 A | | 9/1971 | Rancati | 35/39 |
| 3,763,648 A | | 10/1973 | Pakter et al. | 58/148 |
| 3,796,043 A | | 3/1974 | Ebdon | 58/127 |
| 3,803,831 A | | 4/1974 | Horzick | 58/126 |
| 3,967,389 A | | 7/1976 | Brooks | 434/304 |
| 3,978,655 A | | 9/1976 | McGillick | 368/228 |
| 4,006,588 A | | 2/1977 | McMahon et al. | 368/233 |
| 4,124,945 A | | 11/1978 | Totten | 434/304 |
| 4,206,592 A | | 6/1980 | Maue | 368/233 |
| 4,702,615 A | | 10/1987 | Havel | 368/82 |
| 4,812,627 A | | 3/1989 | Wexler et al. | 705/32 |
| 4,819,162 A | | 4/1989 | Webb, Jr. et al. | 705/32 |
| 4,937,599 A | | 6/1990 | Green | 346/145 |
| 4,975,842 A | | 12/1990 | Darrow et al. | 600/300 |
| 5,271,172 A | | 12/1993 | Ureta | 40/107 |
| 5,459,657 A | | 10/1995 | Wynn et al. | 705/32 |
| 5,526,327 A | | 6/1996 | Cordova, Jr. | 368/82 |
| 5,638,341 A | | 6/1997 | Amano | 368/223 |
| 5,646,913 A | | 7/1997 | Quesenberry | 368/223 |
| 5,662,479 A | | 9/1997 | Rogers | 434/304 |
| 5,694,376 A | | 12/1997 | Sullivan | 368/82 |
| 5,717,867 A | | 2/1998 | Wynn et al. | 705/32 |
| 5,751,663 A | | 5/1998 | Johnson | 368/77 |
| 5,877,953 A | * | 3/1999 | Clendenen et al. | 700/17 |

(Continued)

OTHER PUBLICATIONS

Product: TimeTiger; Company: Indigo Technologies LTD; web site: http://www.indigo1.com/.

(Continued)

*Primary Examiner*—Wesner Sajous
(74) *Attorney, Agent, or Firm*—Pillsbury Winthrop Shaw Pittman, LLP

(57) ABSTRACT

A timekeeping system and method is provided for enabling users to graphically represent one or more activities, as well as the time that has been allocated to each. A graphical display uniquely identifies activities or events based on different visual indicators (e.g., colors), as well as a dimension (e.g., length, area, etc.) that visually represents the duration of the activities or events. At least one dimension of the visual indicator changes in real time to represent the elapsed time of an activity. A report module comprising a report generator and report editor is provided to enable users to account for and summarize the time that has been spent on various activities.

31 Claims, 24 Drawing Sheets

U.S. PATENT DOCUMENTS

| | | | | |
|---|---|---|---|---|
| 5,943,300 | A | 8/1999 | Johnson | 368/77 |
| 6,018,289 | A | 1/2000 | Sekura et al. | 340/309.4 |
| 6,031,791 | A | 2/2000 | Thoni | 368/80 |
| 6,088,303 | A | 7/2000 | Oishi | 368/41 |
| 6,198,698 | B1 | 3/2001 | Graves | 368/82 |
| 6,266,295 | B1 * | 7/2001 | Parker et al. | 368/28 |
| 6,330,007 | B1 | 12/2001 | Isreal et al. | 345/762 |
| 6,477,117 | B1 * | 11/2002 | Narayanaswami et al. | 368/251 |
| 7,103,843 | B2 * | 9/2006 | Hand et al. | 715/734 |
| 2003/0135481 | A1 * | 7/2003 | Helmes et al. | 707/1 |
| 2003/0217961 | A1 * | 11/2003 | Hopping | 210/258 |
| 2006/0203993 | A1 * | 9/2006 | Busey et al. | 379/265.09 |
| 2006/0218588 | A1 * | 9/2006 | Kelts | 725/39 |

OTHER PUBLICATIONS

Product: Time Shadow; Company: Software Maniacs; web site: http://www.softwaremaniacs.com/about.shtml.

Product: Timelot; Company: Xtralot; web site: http://www.xtralot.com.

Product: TimeWin: Company: Thunder Creek software; web site: http;//www.thundercreek.com/index.html.

* cited by examiner

TIMEKEEPING SYSTEM AND METHOD FOR GRAPHICALLY TRACKING AND REPRESENTING ACTIVITIES

FIELD OF THE INVENTION

This invention relates generally to time tracking or recordation, and more particularly to a timekeeping system and method for enabling users to graphically represent one or more activities, as well as the time that has been allocated to each.

BACKGROUND OF THE INVENTION

The concept of accounting for one's time while performing various tasks is a concept that is well known and applicable to many various occupations or fields of endeavor. Lawyers in a law firm, for example, are often required to account for (in detail) the time spent on client matters. In fact, most professionals that charge an hourly rate for their services (e.g., automotive mechanics, service technicians, accountants) typically use some type of timekeeping device to ensure that consumers or clients are billed fairly for the services performed.

One drawback associated with existing automated timekeeping systems, however, is their sole reliance on predetermined charge codes or numbers. Employers, for example, frequently assign different charge numbers for each task an employee may perform, as well as for each project, contract, or client an employee may devote time to. In many workplaces, the process of accounting for time spent working on various matters (and subsequently recording that time using the appropriate charge numbers) is often the responsibility of the individual employee. In such instances, accounting for one's time can be a cumbersome and error prone operation, especially when there is a significant list of different charge numbers an employee must remember, or when the employee frequently switches between tasks that require different charge numbers. In these situations, the goal of efficiently managing time is often eclipsed by the effort of simply recording how it was spent.

Alternatively, a number of timekeeping devices (e.g., watches) have been used for tracking time. In some instances, many such devices have used some form of color-coding for various purposes including displaying the current time, displaying events or conditions that are scheduled to occur, and comparing an instant in time to predetermined time limits. One drawback associated with existing color-coding techniques is that, in most cases, the color-coded region may either be fixed or set in advance. Because known color-coding techniques do not correspond to a record of activities that were actually performed, or conditions that actually occurred, such devices may not be effectively used to record and display information about situations or events that actually happened.

These and other drawbacks exist.

SUMMARY OF THE INVENTION

The invention solving these and other problems relates to a timekeeping system and method for enabling users to graphically represent one or more activities, as well as the time that has been allocated to each.

One object of the invention is to enable a user to define a set of activities that he or she wishes to track, as well as a visual indicator (e.g., color) to be associated with each defined activity. Activities may, for example, correspond to actions performed by the user and/or conditions experienced by the user, in addition to any process, event, or situation that a user may encounter, or any other phenomena that may occupy a span of time.

Another object of the invention is to record and graphically display information about one or more activities, wherein the graphical display uniquely identifies activities or events based on different visual indicators (e.g., colors), as well as a dimension (e.g., length, area, etc.) that visually represents the duration of the activities or events.

According to an embodiment, a visual indicator for an activity may be displayed on, for example, a graphical representation of a clock as the activity occurs. At least one dimension of the visual indicator may change in real time to represent the elapsed time of the activity. In one embodiment, the visual indicator may comprise, for instance, an arc of color (associated with the activity) that is swept out by the hour hand as between the time the activity started and stopped.

These and other objects of the invention may be achieved through a Timekeeping System and Method for Graphically Tracking and Representing Activities. According to one embodiment, the invention may comprise a stand-alone software application, or may be incorporated into a separate, existing software application. The application may be stored on a hard drive of a computer, or stored on removable media (e.g., a CD ROM) that may be required to be present in a media reader (e.g., CD-ROM drive) for the application to run. In an alternative embodiment, a network server may host the application, thus requiring a user at a computer to access the server over a network to utilize the application. In yet additional embodiments, the application may be run on small, hand-held computers, cell-phones, wristwatches, or the like. According to yet another embodiment, one or more of the various features or functions of the invention (as disclosed herein) may also be selectively incorporated into known electronic billing applications.

According to an embodiment of the invention, the application may comprise an activity control module, a display module, and a report module, each of which may implement the various features and functions of the invention, as described herein. Additional modules may be provided. One or more of the modules may be combined. For some purposes, not all modules may be necessary.

According to an embodiment of the invention, the activity control module may enable a user to specify a plurality of activities that may be performed, and to further associate a visual indicator with each activity. Examples of suitable visual indicators may include, but are not limited to, color, shades of a particular color, differing textures, patterns, pictures, degrees of luminescence or transparency, animated scenes, and numbers or words. The activity control module may also allow a user to indicate when he or she commences performing a particular activity, or when a particular activity begins to occur, and when it ends.

According to an embodiment of the invention, the display module may enable regions of a face of a clock to be filled with color to provide a visual indication of activities that have actually occurred. The counterclockwise-most extent of each region may, for example, correspond to the start time of one or more activities, while the clockwise-most extent of each region may correspond to the stop time of the activity or activities to which the region corresponds.

According to an embodiment of the invention, the report module may account for and/or summarize the time that a user has spent on various activities. The report module may, in certain implementations, further comprise a report editor and/or a report generator. A user may use the report editor to specify for which activities or time periods he or she would like to display information. The report module's report generator may display information about the activities or time periods of interest, and may further update the displayed information in real-time. The report module may also export timing information in various formats that may be read by other software packages. In some embodiments, the report module may be part of (or may be integrated with) an electronic billing system.

For exemplary purposes only, and without imposing any limitations on the possible applications or embodiments of the invention disclosed herein, a description of one implementation of the invention is now set forth by describing how, for instance, an employee may use the application to record time at work.

First, according to an embodiment of the invention, an employee may access the application and, via the activity control module, input various activity names and charge numbers which correspond to the activity names. The term "activity" should be broadly defined to encompass any task, project, event, client, matter, or other definable occurrence for which an employee may (or may not) perform work. The employee may then select one of a plurality of colors to be associated with each activity (or charge number). According to other embodiments, the activity control module may already include one or more pre-defined activity names or charge numbers, or an employer may first input any or all activity names and charge numbers that any employee may be expected to use.

The activity control module may then generate and display a color-coded selection mechanism (e.g., button) for each activity that an employee (or employer) enters. The colors displayed on the activity buttons correspond to the color associated with the button's activity. The activity control module may also display one or more additional selection mechanisms (or buttons) associated with various built-in activities named, for example, "Not Working," or "Lunch Break." Various other selection mechanisms may be presented.

According to an embodiment, when an employee commences work on an activity, he may press the activity button corresponding to a charge number to be used for that activity. Each of the three software modules may respond to this action. The activity control module may, for example, display the selected activity button as depressed. The report generator may update information about the amount of time charged to the selected charge number at a desired increment (e.g., seconds, minutes, or multiples thereof). The display module may display a clock face. The hour hand of the clock face may begin to deposit color on the clock face behind it as it moves. The color deposited is the color associated with the selected activity.

When an employee begins working on a task whose time is to be charged to a different charge number, he or she may press an activity button for the new task. In response, the activity control module may now display the previously selected activity button as un-depressed, and display the most recently selected button as depressed. The report generator may continue to update the report information at a desired increment. The hour hand of the clock face (displayed by the display module) may begin to deposit the color associated with the newly selected activity behind it as it moves.

An employee may select (or press) the "Not Working" activity button (or other designated selection mechanism) to indicate when he is no longer working on a task, is taking a break, or has ceased work for the day. The "Not Working" activity may be associated with a color that is the same color as the background of the face of the display module's clock.

By the end of a work day, the display module's clock may be covered with wedge-shaped sections of color providing a graphical summary of the day's activities. If an employee is interested in viewing information about the time charged to each charge number or the total time worked, he or she may access the report editor to submit a query for the desired information.

Occasionally, an employee may wish to record that he is simultaneously engaged in multiple activities, such as performing work that is to be charged to several different accounts, or because he is switching between several tasks so frequently that it is not practical to record every transition from one activity to another. In these situations, the employee may invoke a dialog box from the activity control module that allows him to describe which activities are occurring in parallel, as well as how his time should be allocated between the activities.

When an employee is performing multiple activities at the same time, the hour hand may deposit multiple colors behind it as it moves. These colors may correspond to the colors of the activities that are happening simultaneously, and may form a rainbow-like arrangement of concentric bands on the face of the clock. The width of each band may correspond to the amount of time the employee is allocating to each activity.

Various additional embodiments may include various features and functionality such as, for example, the capability to retrieve lists of activities from a computer network and report timing information to other systems over a network.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

DETAILED DESCRIPTION OF THE PREFERRED EMBODIMENTS

Figure 1:
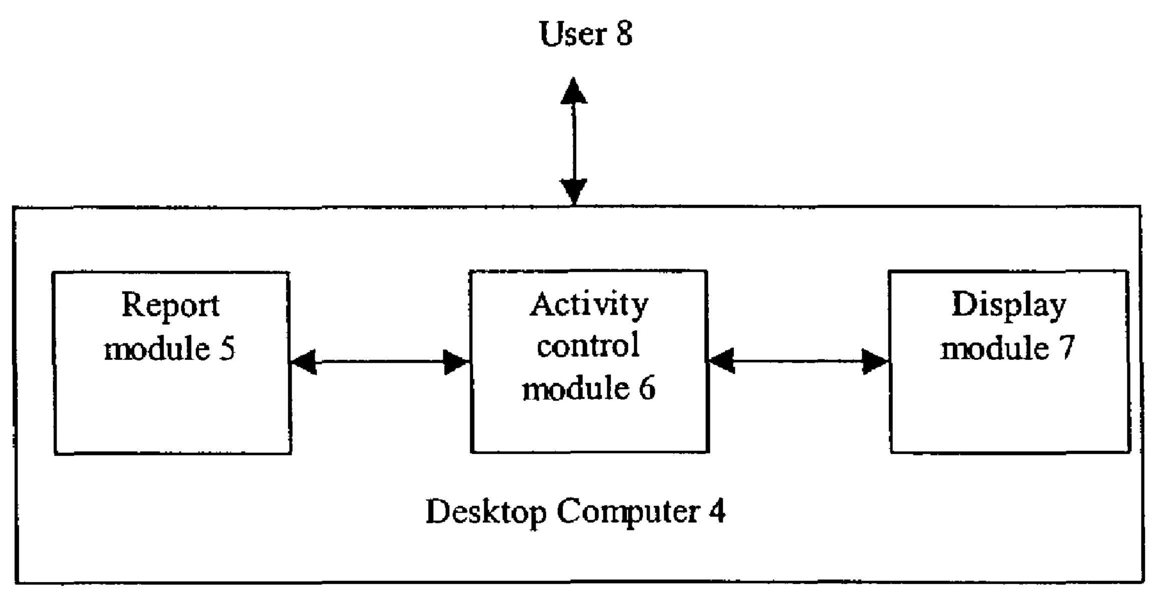
FIG. 1 is a schematic diagram of a timekeeping system, according to an embodiment of the invention.

With reference to FIG. 1, an embodiment of the invention may comprise a timekeeping system for graphically tracking and representing activities. The system may include a desktop computer 4, accessible by a user 8, that runs an application. The application may comprise a report module 5, an activity control module 6, and a display module 7, each of which may implement the various features and functions of the invention, as described herein. Additional modules may be provided. One or more of the modules may be combined. For some purposes, not all modules may be necessary.

According to an embodiment, the application comprising modules 5, 6, 7 may be a stand-alone software application, or may be incorporated into a separate software application. The application may be stored on a hard drive of desktop computer 4, or stored on removable media (e.g., a CD ROM) that may be required to be present in a media reader (e.g., CD-ROM drive) associated with desktop computer 4 for the application to run.

In an alternative embodiment, a network server may host the application, thus requiring user 8 at desktop computer 4 to access the server over a network to utilize the application. In additional embodiments, desktop computer 4 may be replaced with any suitable client device capable of supporting the application such as, for example, a portable computer, PDA (personal digital assistant), workstation, dumb terminal, web-enabled mobile phone, WAP device, web-to-voice device, or other device. Those having skill in the art will appreciate that the invention works with various system configurations.

Figure 2:
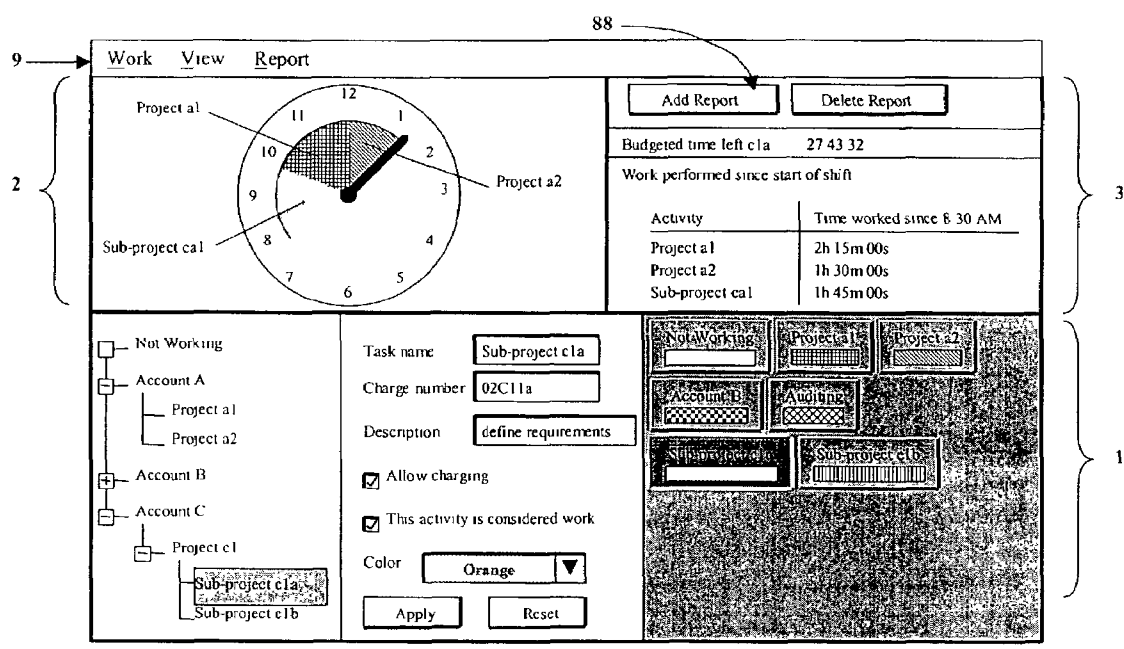
FIG. 2 is an example of a main view that may be presented to a user, according to an embodiment of the invention.

FIG. 2 is an example of a main display (or view) that may be presented to a user when the application is first accessed. As shown, the main display may be divided into three panes. Pane 1 may display controls and information related to the activity control module 6. Pane 2 may display controls and information related to the display module 7, and pane 3 may display controls and information related to the report module 5. Menu 9 may further provide an alternate way for users to command and control the application. Menu 9 may also include some commands that the user can not access through the controls on the main screen. It should be recognized that the term "controls" may be used interchangeably herein with selection portions, links, buttons, and navigational tools (among others) to describe means for enabling users to select, access, display, or navigate through the various displays (or views), portions, or modules of the application.

Figure 3:
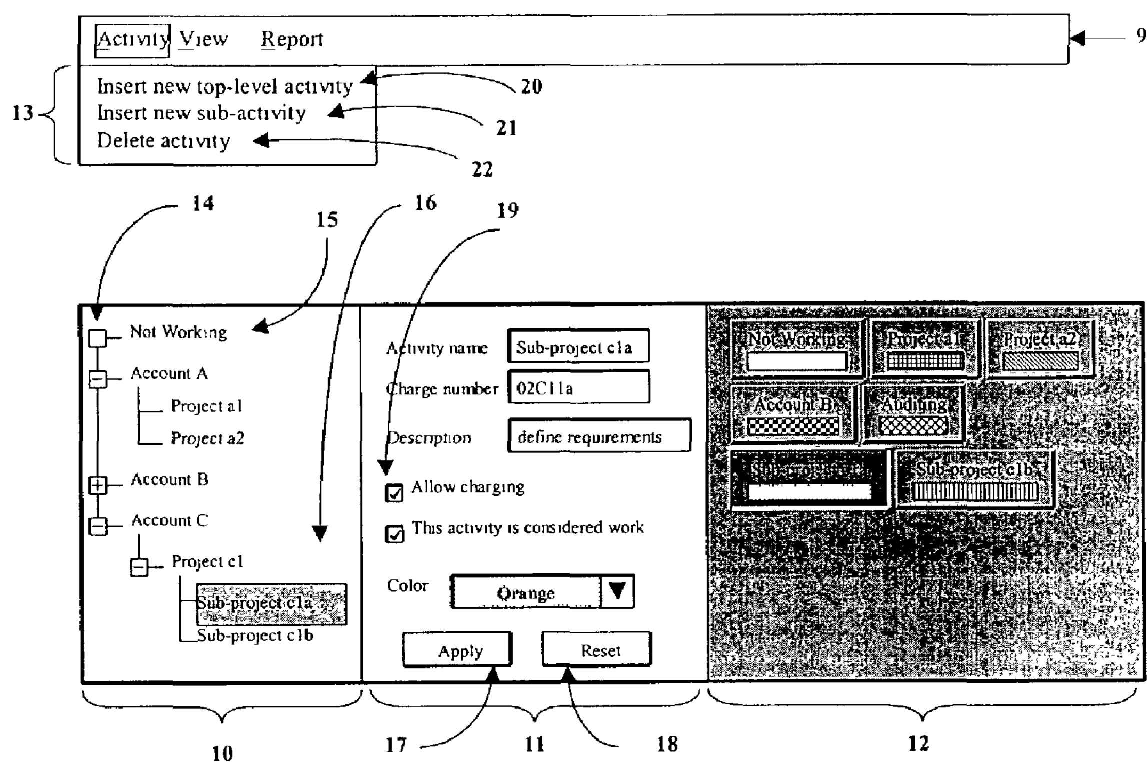
FIG. 3 depicts a view illustrating an embodiment of the activity control module, according to an embodiment of the invention.

The components of the user interface of activity control module 6 are illustrated in FIG. 3. Activity control module 6 may organize activities in a tree-like hierarchy whose structure may be determined by the user. Except for the root node, each node in the tree may represent a single activity that a user may perform. According to an embodiment, each node may have an arbitrary number of child nodes. The child nodes may represent more specific forms of the activity represented by the parent. Each node in the activity tree may also carry various types of information including, but not limited to, the name of the activity, a user-defined charge number to associate with the activity, a user-defined description of the activity, a visual indicator to associate with the activity, whether a user may charge time to the activity, and whether the activity is considered work. Examples of suitable visual indicators may include, but are not limited to, color, shades of a particular color, differing textures, patterns, pictures, degrees of luminescence or transparency, animated scenes, and numbers or words.

As shown in FIG. 3, control cluster 10 illustrates a view of the activity hierarchy. The user interface may display all of the nodes in the activity tree except the root node. According to one embodiment, control cluster 10 may be implemented with a standard tree control such as that provided with the Microsoft Windows™ 2000 Operating System. The activity hierarchy control cluster 10 may also enable a user to select a single activity at a time. When a user selects an activity, the activity parameters control cluster 11 may be populated with information associated with the selected activity.

According to one embodiment, a user may have the capability to alter the information presented in the controls of activity parameters control cluster 11. If the user alters any information in the controls and presses the "Apply" button 17, the change may be communicated to activity control module 6, display module 7, and report module 5. If the user presses the "Reset" button 18, the controls may be repopulated with the information they contained when the "Apply" button was last pressed.

All activities that a user is allowed to charge (i.e., the activity's "Allow charging" checkbox 19 is checked) may be represented in the Activity Button Field 12. Each button in button field 12 may bear the name of the activity it represents and a colored bar indicating the color associated with the activity. A user may indicate a current activity by pressing the button that corresponds to the activity he is performing. When a button is pressed, it may be rendered with a shaded color, and the previously selected button may be redrawn without shading.

The activity sub-menu 13 may allow a user to add or remove activities from the activity tree. When a user picks the "Insert new top-level activity" menu item 20, the application may create a new activity named "New Task". The new activity may be added to the hierarchy as a child of the root activity. The activity hierarchy control cluster 10 and the activity button field 12 may then be updated to show the new activity. Once the new activity has been created, a user may select the activity from the activity hierarchy control cluster 10, and use the controls in the activity parameters control cluster 11 to edit its information.

According to one embodiment, an "Insert new sub-activity" menu item 21 may enable a user to add a child activity to the activity that is currently selected in the activity hierarchy control cluster 10. When a user picks the "Insert new sub-activity" menu item 21, the application may create a new child activity of the activity currently selected in the activity hierarchy control cluster 10. The new activity may be named "New Task." The activity hierarchy control cluster 10 and the activity button field 12 may then be updated to show the new activity. Once the new activity is created, a user may then select the activity from the activity hierarchy control cluster 10, and use the controls in the activity parameters control cluster 11 to edit its information.

A "Delete activity" menu item 22 may enable a user to remove the selected activity, and all of its child activities (if any) from the hierarchy. When a user deletes an activity, the activity hierarchy control cluster 10 and the activity button field 12 may be updated to reflect the new set of activities in the hierarchy. According to one embodiment, the default "Not Working" task may not be deleted.

According to an embodiment of the invention, activity control module 6 may store the activity hierarchy in a non-volatile Data Storage Area (DSA). In one embodiment, the DSA may be implemented as a file on the hard drive of the hosting computer. The DSA may, according to some embodiments, be accessed and modified only by a user logged into the computer (or other device) hosting the application. However, other implementations may exist. For example, according to one implementation, the activity hierarchy may be stored on a network accessible file system to enable multiple users to access and modify a shared activity hierarchy. According to another implementation, the application may retrieve or receive the activity hierarchy from a remote system operated by a supervisor. This technique may enable a supervisor to customize an employee's activity hierarchy based on the tasks the employee was authorized to perform. According to yet another implementation, the activity hierarchy may be stored in a network-accessible relational database. According to still yet another implementation, activity control module 6 may interact with report module 5 and automatically remove or disable activities when a user has spent a predetermined amount of time performing the activity.

According to one embodiment of the invention, the activity hierarchy may represent a set of activities that a user could perform, while not including information about what activities a user actually did perform. Rather, the historical timing information regarding activities that a user actually performed may be stored in data structures called spans. A span may represent the performance of a single activity, known as a target activity, for a given time period.

Although different kinds of spans may exist, each kind of span may generally describe two quantities: duration and accumulated time. Duration may be generally defined as the length of time span over which an activity occurred. Accumulated time may generally be defined as the amount of time within the time period of the span spent on the target activity.

According to an embodiment of the invention, three primary types of spans may be utilized: primary spans, secondary spans, and unassociated spans. Other types of spans may exist. According to an embodiment of the invention, activity control module 6 may maintain a primary span list and an unassociated span list in the DSA.

Primary spans may, for example, represent the background or default activities performed by a user. The data structure that represents a primary span in the computer's memory may contain the time the activity began, the time it ended, and a reference to the target activity.

A secondary span may, according to an embodiment, represent an activity that was performed in parallel with an activity described by a single primary span. The single primary span targeted by the secondary span may be referred to as the linked-to primary. A secondary span's accumulated time may be defined as a function of the accumulated time of the linked-to primary. The data structure that represents a secondary span may contain a reference to the linked-to primary, a reference to the target activity, and a description of the function that maps the primary's accumulated time to the secondary's accumulated time.

Finally, an unassociated span may represent an activity performed in parallel with several primary activities. The data structure that stores an unassociated span may contain a start time, a stop time, and a reference to the target activity.

Having first provided a brief overview of primary spans, secondary spans, and unassociated spans, each will now be discussed in detail.

Figure 4:
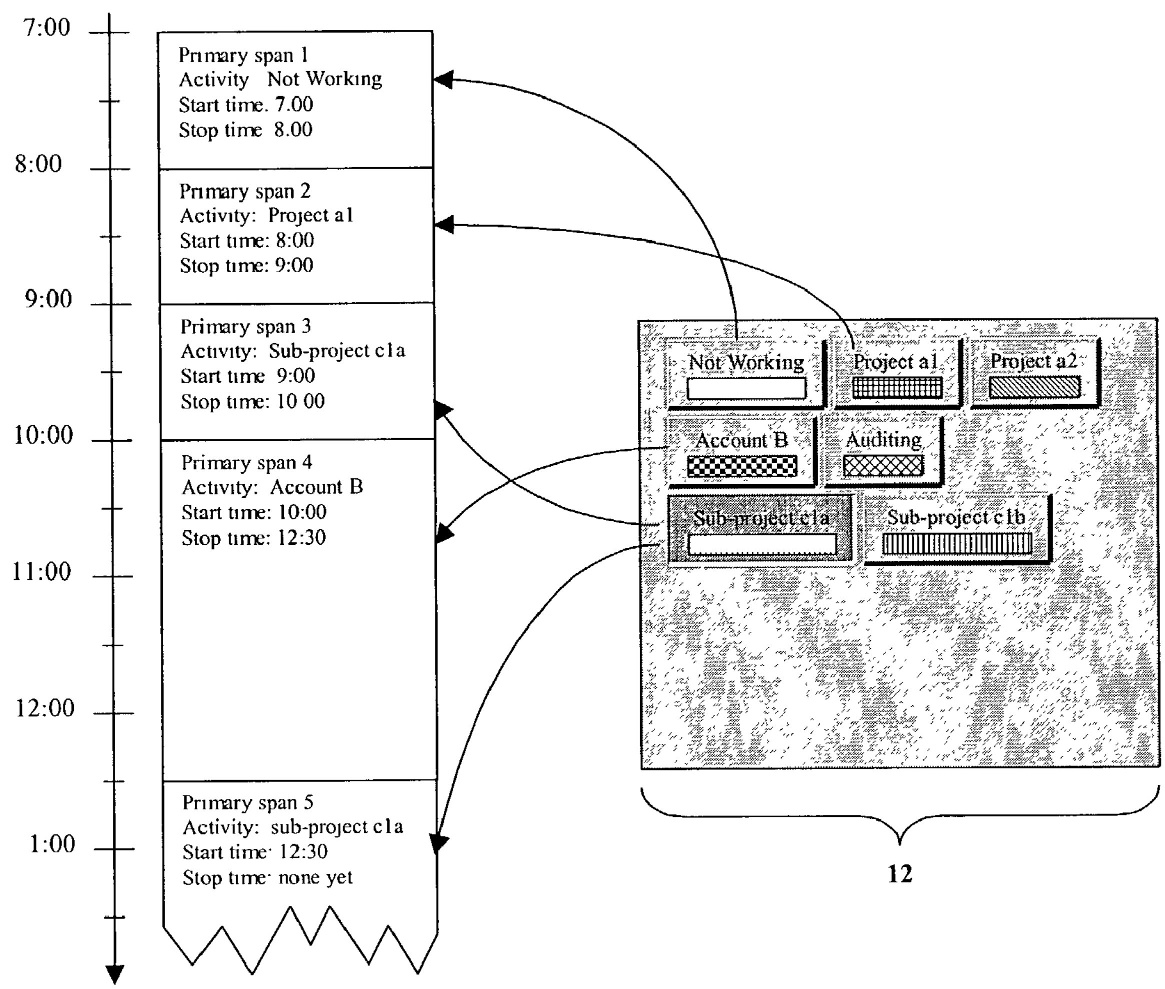
FIG. 4 illustrates an example of primary spans created as a user selects buttons from the activity button field, according to an embodiment of the invention.

According to an embodiment of the invention, primary spans may correspond to selections that a user may make in activity button field 12. FIG. 4 provides an illustrative example of the process by which primary spans may be created and added to the primary span list. As depicted, when the application was installed at 7:00, the default "Not Working" task was automatically selected and the first primary span was added to the primary span list. At 8:00, a user pressed the activity button for activity "Project a1." The stop time for primary span 1 was filled in with the current time, and primary span 2 was created to reflect the user's new activity. Primary spans 3 and 4 were created at 9:00 and 10:00 when the user pressed the "Sub-project c1*a*" and the "Account B" buttons, respectively. The last span in the primary span list, span 5, was created at 12:30 when the user pressed the "Sub-project c1*a*" button for the second time.

Since "Sub-project c1*a*" is illustrated as being the current activity, span 5's stop time is not filled in. If the user exits and restarts the application, or even reboots the computer, "Sub-project c1*a*" may still be the considered the current activity. Its activity button will be drawn as depressed and span 5's stop time will not be filled in.

Figure 5:
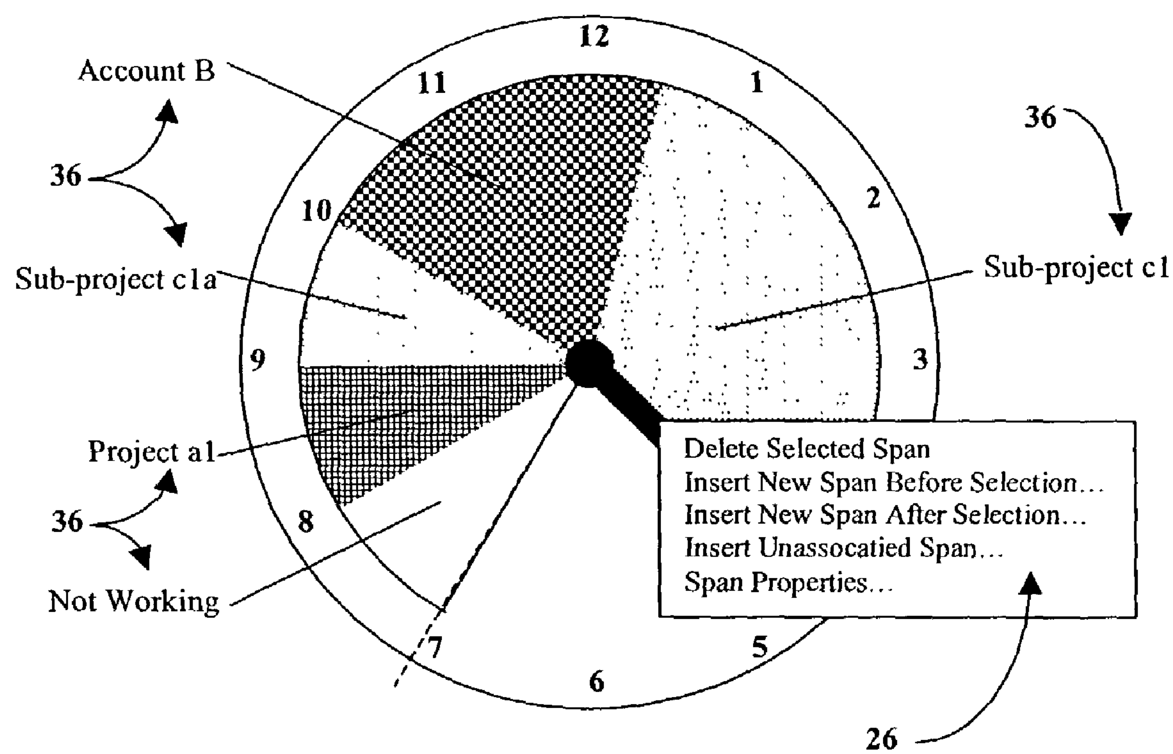
FIG. 5 illustrates the link between the display control module and the activity control module, according to an embodiment of the invention.

FIG. 5 illustrates a pop-up menu 26 that may be invoked when a user presses a right mouse button over one of the colored regions of the display module's clock face. It should of course be recognized that any suitable input device (e.g., keyboard, light stylus instrument, etc.) may be used in place of a computer mouse. If a user selects the "Delete Selected Span" menu item, the selected span (the span the user clicked over to invoke the menu) may be removed, and the prior span's stop time may be set to the deleted span's stop time.

If a user selects the "Insert New Span Before Selection . . . " menu item, a new primary span with the default activity "Not Working" and a start and stop time equal to the selected span's start time may be inserted in the primary span list immediately before the selected span.

Similarly, if a user selects the menu item "Insert New Span After Selection . . . " a new primary span with the default activity "Not Working" and a start and stop time equal to the selected span's stop time may be inserted in the primary span list immediately after the selected span.

Figure 8:
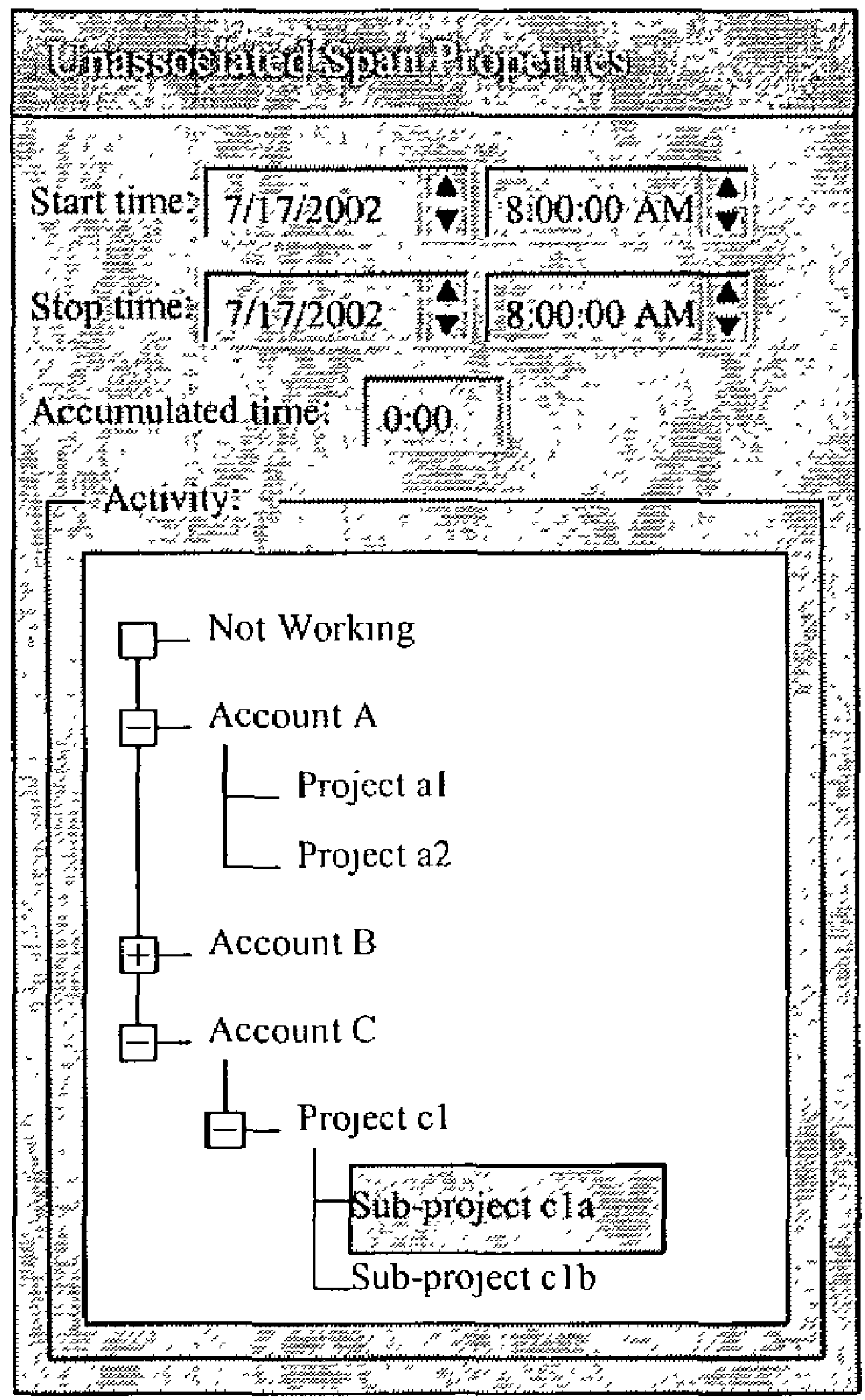
FIG. 8 depicts one example of the dialog box used to create and modify unassociated spans, according to an embodiment of the invention.

If a user selects the "Insert Unassociated Span . . . " menu item, the Unassociated Span Properties Dialog Box shown in FIG. 8 may be invoked. This dialog may allow the user to specify start time, stop time, and accumulated time of a new unassociated span.

If a user picks the "Span Properties . . . " menu item having first invoked the pop-up menu 26 by clicking over a region representing an unassociated span, the Unassociated Span Dialog Box shown in FIG. 8 may be invoked. This dialog may allow the user to modify the start time, stop time, and accumulated time of an existing unassociated span.

Figure 6:
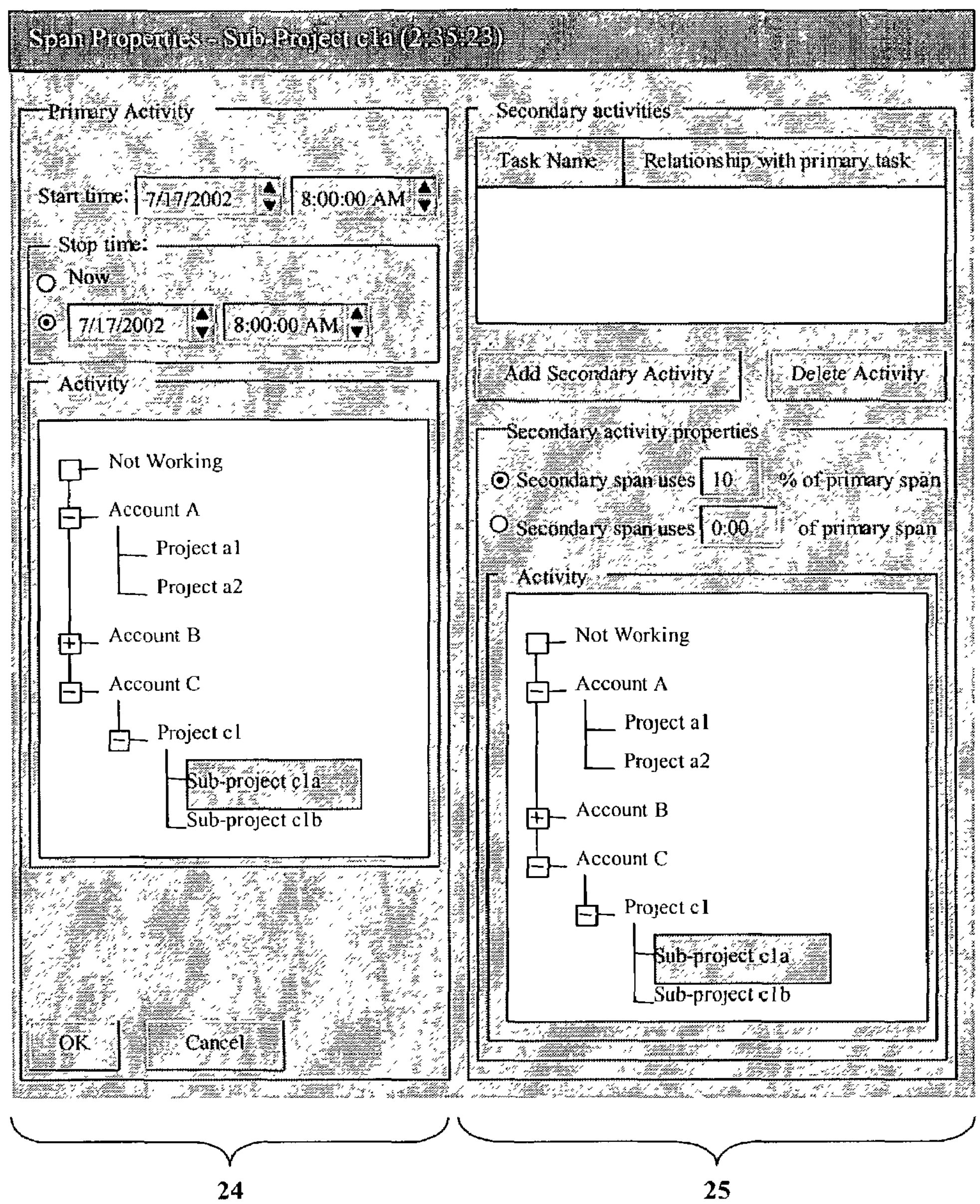
FIG. 6 depicts one example of the Primary Span Properties dialog box, according to an embodiment of the invention.

If a user picks the "Span Properties . . . " menu item, the Primary Span Properties Dialog Box illustrated in FIG. 6 may be invoked. This dialog box may serve at least two functions. First, the dialog box may enable users to edit the properties of a primary span, as well as add, remove, or change the secondary spans that may be associated with a particular primary span.

According to an embodiment, the controls on the left side of the Primary Span Properties Dialog box 24 may be used to modify the primary span that is displayed by the dialog box. A user may change the start and stop times of the span and may change the primary span's activity.

Figure 7:
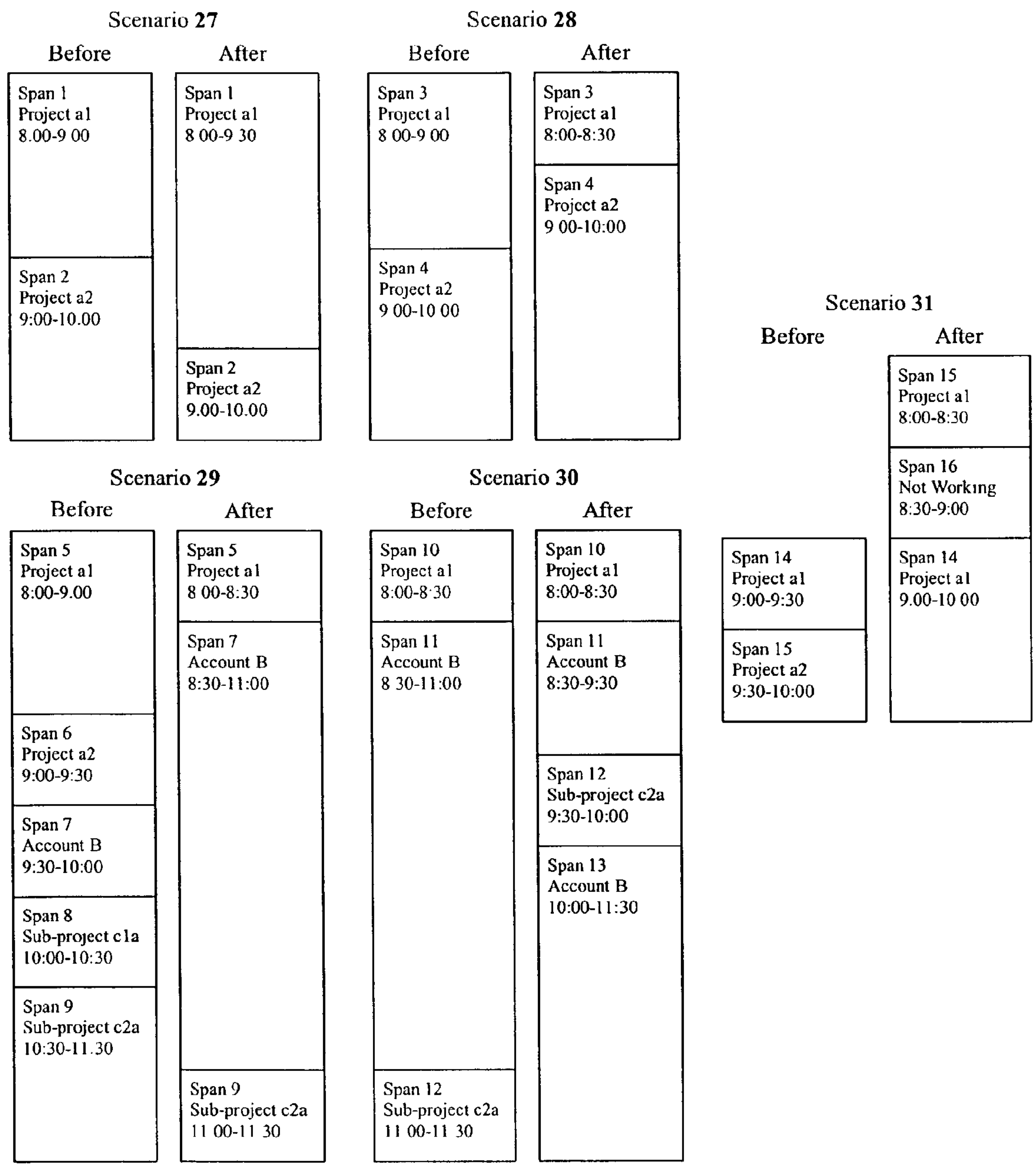
FIG. 7 illustrates an example of how the primary span list may be modified when the start and stop time of one of the primary spans is changed, according to an embodiment of the invention.

FIG. 7 illustrates, through various scenarios, examples of how the primary span list may be affected when the start or stop time of a primary span is modified. In scenario 27, for example, an exemplary case is provided wherein the stop time of a primary span (span 1 in the figure) is moved ahead so that it falls between the start time and stop time of the next span in the list (span 2). In this situation, the start time of the next span may be adjusted to be equal to the modified span's new stop time.

Scenario 28 depicts a case wherein the start time of a primary span (span 4 in the figure) is changed to fall between the start and stop times of the previous span (span 3). In this case, the stop time of the prior span may be set equal to the new start time of the modified span.

Scenario 29 illustrates how the primary span list may be modified when a primary span (span 7 in the figure) is expanded past the duration of its adjacent spans. All primary spans whose start and stop times fall within the modified span's new start and stop may be deleted. Scenario 29 shows that spans 6 and 8 were removed after span 7 was expanded to include their ranges.

Scenario 30 shows that new primary spans may be created when existing spans are moved. Scenario 30 depicts a span (span 12 in the figure) modified so that its new stop time is before its original start time. In this situation, a copy of the primary span that the modified span moves into is created to fill in the gap formed after the modified span. Span 13 in the figure is created to offset the backwards motion of span 7.

Scenario 31 illustrates the resolution of the situation wherein a span is moved to a time before the start time of the first primary span in the list. When span 15 is moved so its new stop time is before the start time of the first span in the primary span list, a new span (span 16 in the figure) is created to fill the gap. The new span's activity is set to "Not Working" because the application may have no information about the user's activities prior to span 14.

According to an embodiment of the invention, secondary spans may be used to express simultaneous activities wherein the amount of time spent performing one of the activities is defined in terms of the accumulated time of another. For example, a worker who spends time ordering a quantity of material that is to be used for two projects (A and B) may wish to have the application automatically charge some percentage of his time to project A's account, with the remainder charged to project B's account.

Another example that illustrates motivation for the secondary span feature involves that of an employer running a promotion wherein the first hour of an employee's labor is free, with the remainder being charged to a customer's account. Using the secondary span feature, an employee could express that the first hour of an activity is to be charged to the marketing (or other generic, non-billable) account, while the rest is to be charged to the customer. The application may then automatically allocate time to the respective activities.

Referring back to FIG. 6, the controls on the right side of the primary span properties dialog box 25 may allow a user to create, modify, and delete secondary spans that are linked to the primary described by the dialog box. According to an embodiment of the invention, a primary span may have any number of secondary spans linked to it. Two functions that enable a user to determine how the application may calculate the time allocated to a secondary span may be described as either percent-linked, or time-linked. If, for example, a secondary span is percent-linked to its primary, its accumulated time may be defined as a percent of the total accumulated time of the primary span. By contrast, if a secondary span is time-linked to its primary span, it may occupy a fixed amount of the primary span's accumulated time. If a primary span is not long enough to support the accumulated time specified by a time-linked secondary span, all of the time in the primary span may be allocated to the secondary span.

According to an embodiment of the invention, unassociated spans may represent activities that are performed in parallel with activities in primary and secondary spans, but whose accumulated time is not a function of the duration of any primary span. One purpose of the unassociated span feature is to allow users to account for background activity that may be impractical to record using primary spans. A worker who is frequently interrupted to answer the phone, for instance, might use an unassociated span to express the fact that one hour between 8:00 AM and 5:00 PM was spent on administrative overhead. The hour may be deducted from all other primary and secondary spans that occurred between 8:00 and 5:00. Time may be deducted from each primary and secondary span in proportion to the duration of the span and according to the rules described below.

Figure 9:
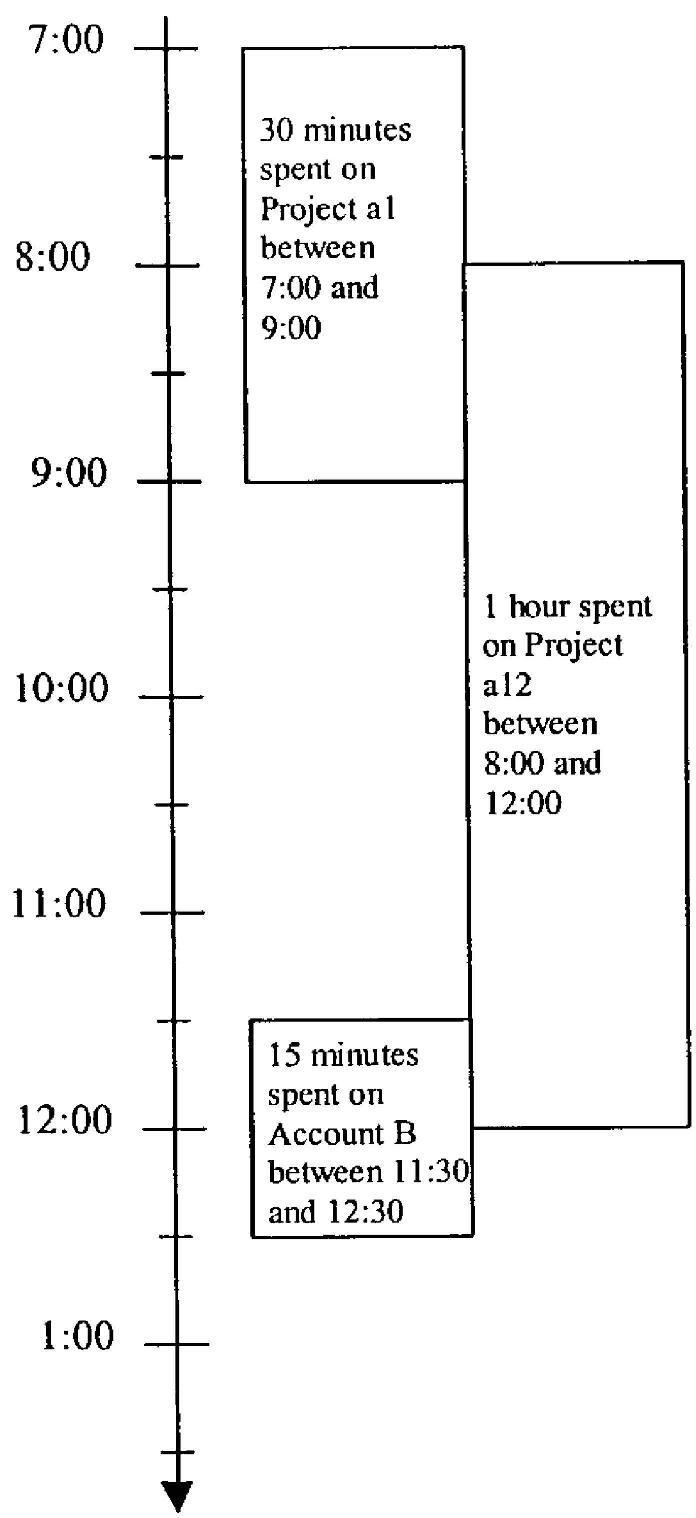
FIG. 9 depicts some unassociated spans, according to an embodiment of the invention.

Unassociated spans may, according to one embodiment, be stored in a separate list of spans in the DSA. FIG. 9 shows an example of a list of unassociated span that contains 3 spans.

According to an embodiment of the invention, a safeguard feature of the application may prevent a user from specifying secondary and unassociated spans that describe an impossible situation. For example, the application may prevent a user from creating an unassociated span that occupies two hours between 1:00 and 2:00, as there is obviously only one hour of time available for an allocation between 1:00 and 2:00.

In another example, the application may prevent a user from adding two percent-linked secondary spans to a primary where each secondary span specifies that it occupies 75% of the primary. This situation would be rejected because it is impossible to allocate more than 100% of a primary span to its secondary spans.

The process of computing the accumulated time of a span may be complex, particularly because the DSA may contain spans that overlap in time. As such, a description of the process for computing accumulated time may be best understood if set forth in an exemplary illustration. Consider, for example, a scenario that contains the following spans:

An unassociated span of activity (A) occupying 30 minutes between 1:00 PM and 3:00 PM;

A primary span of activity (B) extending from 1:00 PM to 4:00 PM;

A secondary span of activity (C) linked to the primary occupying 30 minutes of the primary and An additional secondary span of activity (D) linked to the primary occupying 50% of the primary.

Further consider that a user constructs a tracking report (described in detail below) to compute the time spent on activity (B) between 2:00 PM and 3:00 PM. According to an embodiment, the report generator may determine how much of this one-hour period was spent performing activity (B) by assigning time to spans in the following order:

Unassociated spans may be allocated time first

Time-linked secondary spans may be allocated time next.

Primary and percent-linked secondary spans may be allocated time last.

In this example, the unassociated span of activity (A) may be assigned 15 minutes of the one-hour period between 2:00 PM and 3:00 PM. 15 minutes is the fraction of the span that occurred during the 2:00 PM to 3:00 PM period. The time-linked secondary span of activity (C) may receive time next. 30 minutes of the one-hour target period may be assigned to this span. The remaining 15 minutes may be distributed to the primary and percent-linked secondary spans in proportion to the percent they are assigned. Since the secondary span of activity (D) receives 50% of the remaining time, the primary span of activity (B) receives the remaining 50%. Thus, the tracking report states that 7 minutes 30 seconds were spent on activity (B) between 2:00 PM and 3:00 PM.

According to an embodiment of the invention, when a user deletes an activity from the activity hierarchy, the application may search for any spans that used the activity. If any are found, the application may not remove the activity from the hierarchy. Rather, the application may mark the activity as closed and no longer display it in any view of the hierarchy. Activities that have been used may not be deleted, because it is possible that the spans that used the activity may be targets of a report. According to an embodiment, deleting an activity may only imply that a user has determined that he or she may never charge the activity in the future. The historical record of activities performed may not be changed by removing an activity from the hierarchy.

According to one embodiment of the invention, the application may be configured to remove the oldest spans in the DSA once the DSA has grown to a configurable, maximum size. Alternatively, the application may be configured to remove spans from the DSA once they reach a configurable age. For example, a user may have spans removed once they describe activity that is more than one year old. When a span is automatically deleted from the DSA, the application may check to see if the span's activity is closed. If the activity is closed, and no other spans in the DSA used the activity, the application may delete the activity from the hierarchy.

According to an embodiment of the invention, display module 7 may provide a graphical display of the span information stored in the DSA. As previously recited, spans may be illustrated as colored regions on the face of a clock. The counterclockwise-most extent of each region may correspond to the start time of a span, while the clockwise-most extent of each region may correspond to the stop time of the span. In addition, the color of each region may correspond to the activity performed during the span, while the area of each region may correspond to the accumulated time of the span. The clock displayed by the display module may be equipped, in certain embodiments, with an hour hand only. The graphical display may be updated continuously as the hour hand moves around the clock.

According to an embodiment, the clock face may display a line from the center of the clock to the outer rim, to indicate the earliest time for which the clock may be displaying information. This time, referred to as since-time, may be configurable by the user. Spans whose start times are earlier than the since-time may be cropped so that the span's colored region may not extend prior to the since-time. When the hour hand reaches the since-time, the face of the clock may be wiped clean, and span information may gradually be displayed as the hour hand begins another lap (or sweep).

Figure 10:
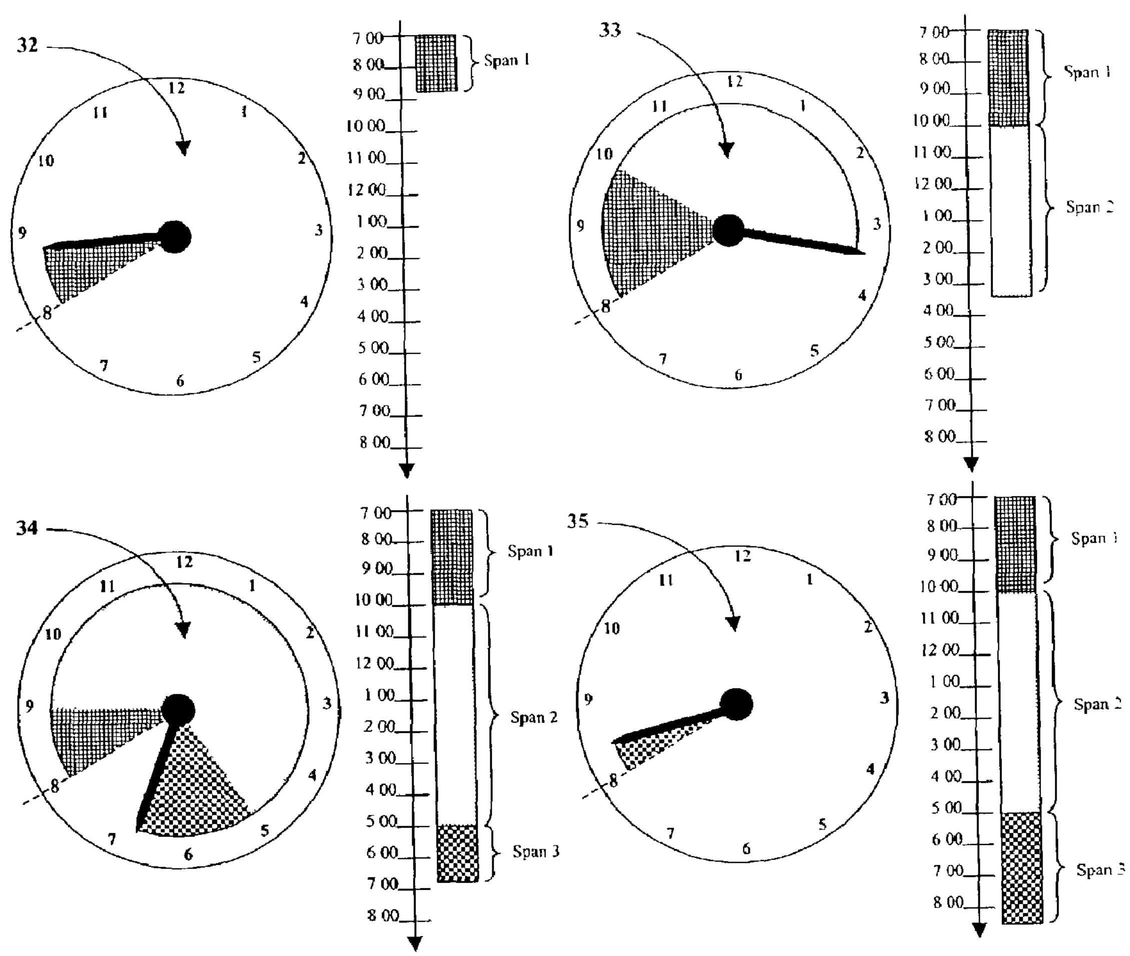
FIG. 10 illustrates how span information may be presented by the display module, according to an embodiment of the invention.

FIG. 10. is an illustration of how the clock face of display module 7 may be updated as time passes and the primary span list is modified. FIG. 10. depicts the clock face as it may appear at four instants during the day. A diagram of the primary span list is shown next to each clock face for reference. The picture of the primary span list is not rendered on the display.

Diagram 32 shows the clock face rendered by the display module at 8:45. Although span 1 started at 7:00, only the portion that exists since 8:00 is shown. This is because the configured since-time is 8:00. As the hour hand moves, it appears to deposit the color associated with span 1's activity on the face of the clock. The growing wedge-shape provides a visual indication of the both the current activity and the amount of time spent on the activity.

Diagram 33 shows the clock face at 3:20. The image on the clock face reveals that span 1 ended at 10:00 when the user began performing the activity associated with span 2. As of 3:20, the hour hand is sweeping out a wedge whose color is the color of span 2's activity.

Diagram 34 shows the clock face at 6:45. Span 2 ended at 5:00 and the hour hand is sweeping out the color for span 3.

As seen in diagram 35, At 8:00, the face of the clock is wiped clean and display module 7 only displays information about activity since the most recent 8:00. Span 3 is cropped to show only the portion that occurred since 8:00.

Display module 7 may, in certain embodiments, annotate the colored regions on the clock face with the names of the activities that the regions represent. FIG. 5, for example, shows the clock face and the annotations 36 that appear on the display module's pane.

Figure 11:
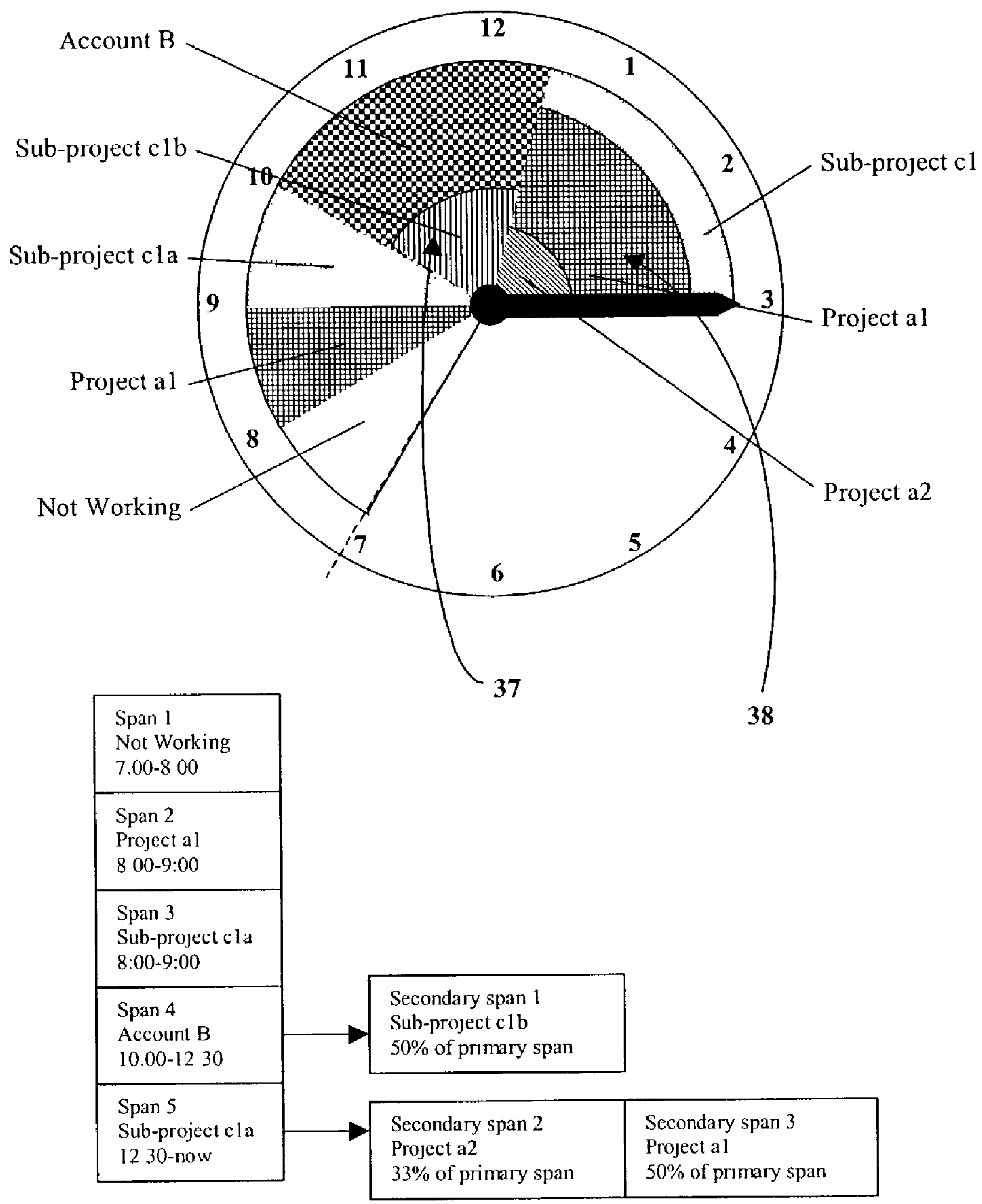
FIG. 11 is an illustration of how the display module may present information about secondary spans, according to an embodiment of the invention.

FIG. 11 depicts how the display module may represent secondary spans, according to an embodiment of the invention. The clock face in FIG. 11 shows five primary spans and three secondary spans. The diagram below the clock illustrates the relationships between the spans. The diagram is presented for reference only and does not appear on the display. Secondary spans may be represented visually, for example, as wedges and segments of rings arranged concentrically with their primary span. Each wedge or ring may bear the color of the activity associated with the secondary span. By convention, the primary span is generally displayed as the outermost ring.

When the current span (the span whose end-time is "now") has secondary spans, the hour hand may appear to sweep out the colors of the primary and each of its secondary spans simultaneously. Display module 7 may draw each wedge or ring segment so that its area represents the accumulated time of the corresponding span. Although alternate embodiments could size each region so that the number of square inches it occupies corresponds to its span's accumulated time, a preferred embodiment measures area in units of inch-degrees. For example, one inch-degree may represent the area created by sweeping any one-inch segment of the radius of a circle through one degree. Two regions generated this way may occupy a much different number of square inches, yet measure the same number of inch-degrees. The areas of FIG. 11's clock face, 37 and 38, that correspond to secondary spans one and three, respectively, may occupy the same number of inch-degrees but clearly have a much different number of square inches. A preferred embodiment uses inch-degrees rather than square inches because it appears to yield a more intuitive visual representation of the accumulated time of each span.

Figure 12:
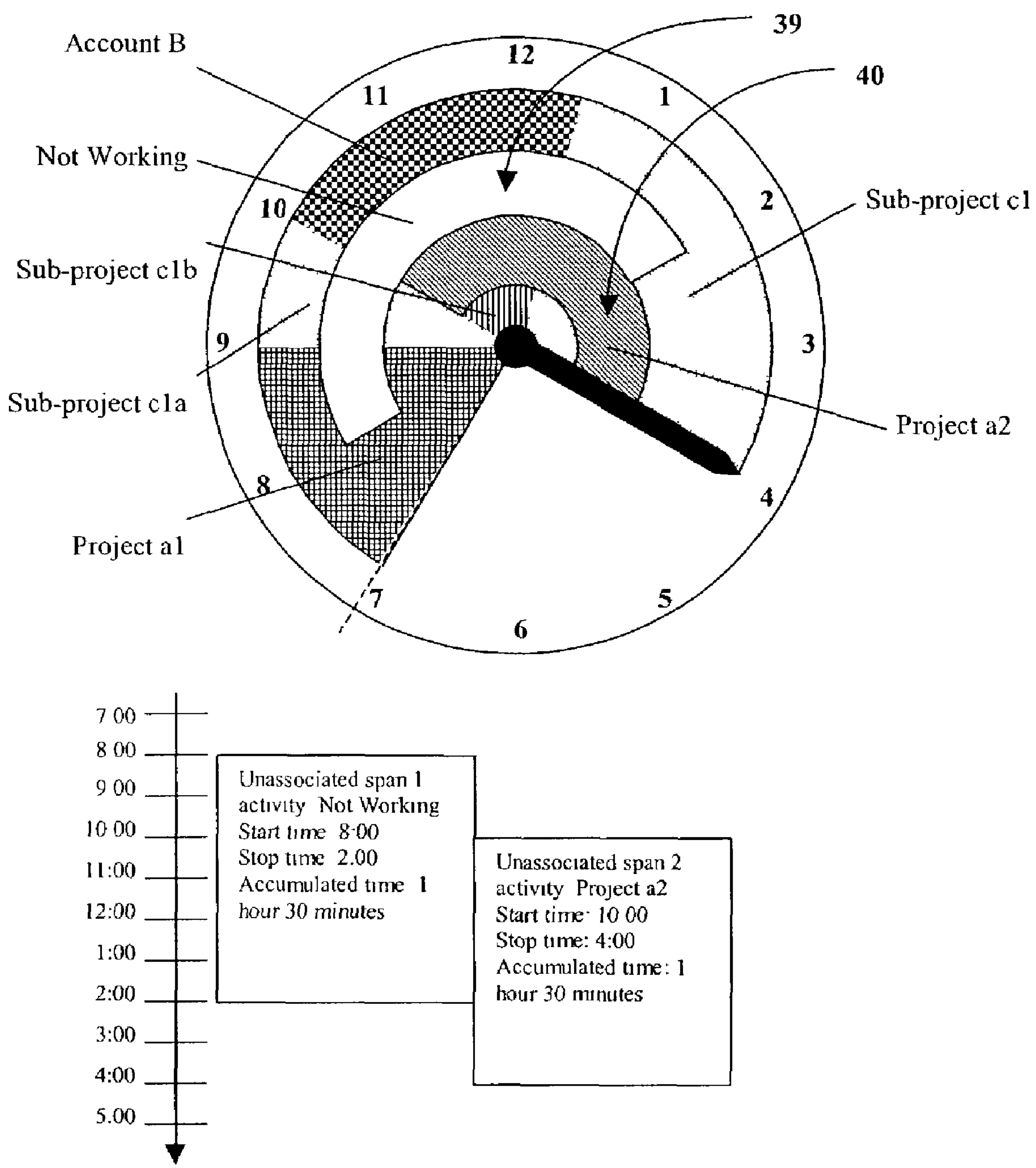
FIG. 12 depicts one example of how the display module may present information about unassociated spans, according to an embodiment of the invention.

FIG. 12 shows how the display module renders unassociated spans on the clock face. The diagram below the clock illustrates the relationships between the unassociated spans. The diagram is presented for reference only and does not appear on the display. Colored regions 39 and 40 correspond to two unassociated spans. Region 39 represents an unassociated span where the user spent 1 hour 30 minutes performing the "Not Working" activity between 8:00 and 2:00. Region 40 represents an unassociated span where the user spent 1 hour 30 minutes working on Project a2 between 10:00 and 4:00. Both regions may be rendered as segments of rings arranged concentrically with the face of the clock. The width of each ring may correspond to the fraction that the accumulated time occupies of the unassociated span's duration. Region 39, for example, may represent a span with an accumulated time of 1 hour 30 minutes spread over a duration of 6 hours. Thus, between 10:00 and 4:00, one quarter of the user's time was spent working on Project a2. Region 39 consequently occupies one quarter of the area (as measured in inch-degrees) of the total area of the clock face between 10:00 and 4:00.

According to an embodiment, the distance that each unassociated span's ring appears from the center of the clock may not relate to any attribute of the span. However, display module 7 may arrange unassociated spans' rings so that they do not overlap one another.

In various implementations of the invention, display module 7 may display the current time and historical timing information in local time, (i.e, the time zone in which the computer is located typically dictates how timing information is presented by display module 7). Many regions may implement a form of Daylight Saving Time (DST) where the local time is adjusted so that the time-of-day remains consistent with the hours that the sun is "up." During transitions to and from DST, one hour is artificially removed from or added to a day. Accordingly, display module 7 has knowledge of the DST transition scheme for each distinct nation and time zone and is able to display special clock faces that provide a visual indication of the extra or missing hour.

Figure 13:
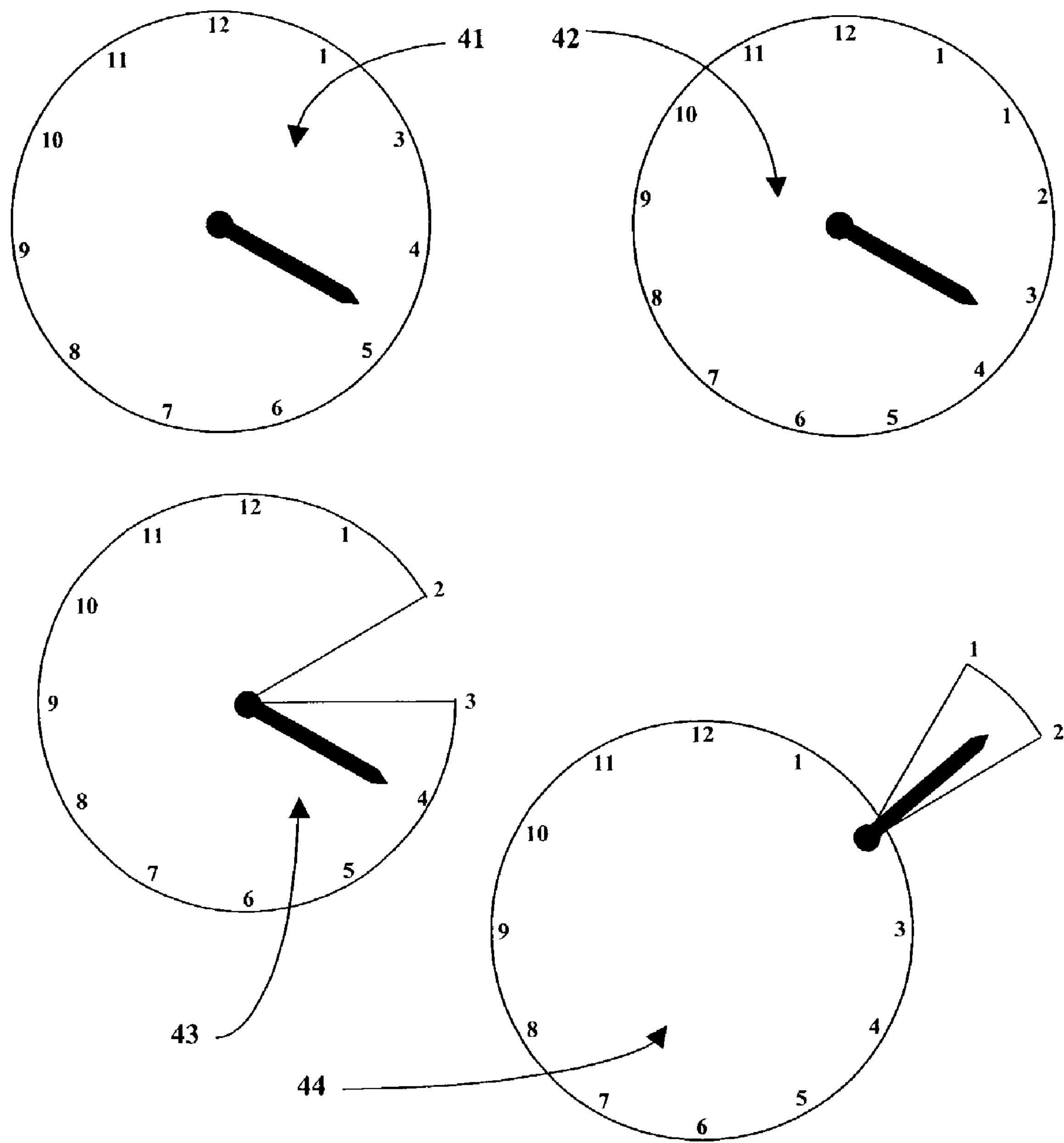
FIG. 13 depicts various schemes for indicating the transition to and from Daylight Saving Time, according to an embodiment of the invention.

FIG. 13 depicts various schemes for indicating the DST transitions on the face of the display module's clock. Clock face 41 may be used when the local time zone "springs ahead" into DST. During the spring ahead period, the minute 1:59 AM is immediately followed by 3:00 AM. The hour from 2:00 to 3:00 has been left off the clock and the remaining 11 indicia have been shifted to maintain even spacing around the perimeter of the clock. When clock face 41 is in use, the hour hand may travel at a slightly faster rate so that it completes one rotation in 11 hours rather than 12.

Clock face 43 displays an alternate means of indicating the "spring ahead" into DST. In clock face 43, the hour from 2:00 AM to 3:00 AM has been cut out of the clock. When the hour hand reaches 2:00 AM it instantly jumps to the 3:00 AM position. Except for the jump, the hour hand may move around the clock face at the standard rate of thirty (30) degrees per hour.

Clock face 42 may be used when the local time "falls behind" during the transition from DST to Standard time. During the fall behind period, the minute 1:59 AM is immediately followed by 1:00 AM again. Clock face 42 therefore displays two 1:00 hours. The indicia have been shifted to maintain an even spacing around the perimeter of the clock. When clock face 42 is in use, the hour hand may travel at a slightly slower rate so that it completes one rotation every 13 hours.

Clock face 44 is an alternate means of indicating the "fall behind" from DST to Standard time. Clock face 44 has been outfitted with an extra wedge representing the extra hour inserted between 1:00 AM to 2:00 AM. When the hour hand reaches the position where 2:00 would be on a standard clock, it is removed from the clock face and is placed at the vertex of the extra wedge. The hour hand may then move across the extra wedge, indicating that the current hour is the transitional one. When the clock hand reaches the end of the wedge, it is moved back to the standard position at the center of the clock. The hour hand may then proceed from 2:00 to 12:00 in the usual fashion.

The clocks displayed in FIG. 13 illustrate examples that use the United States of America's convention of having the DST transition discontinuity occur just before 2:00 AM. Other nations use different transition times. Display module 7 may be configured to render the special DST transitional clock face using the appropriate local convention.

In some instances, when the activity hierarchy is large and intricate, a user may wish to simplify the information presented by display module 7 by viewing only the higher level portions of the hierarchy to which each span's activity belongs. In the activity hierarchy presented in FIG. 3, for example, a user may want display module 7 to show the activity Account C whenever a span's actual activity was Sub-project c1*a* or Sub-project c1*b*. By "rolling up" each span's activities into their parent activities, a fragmented and confusing arrangement of wedges and rings may be made more comprehensible.

Figure 14:
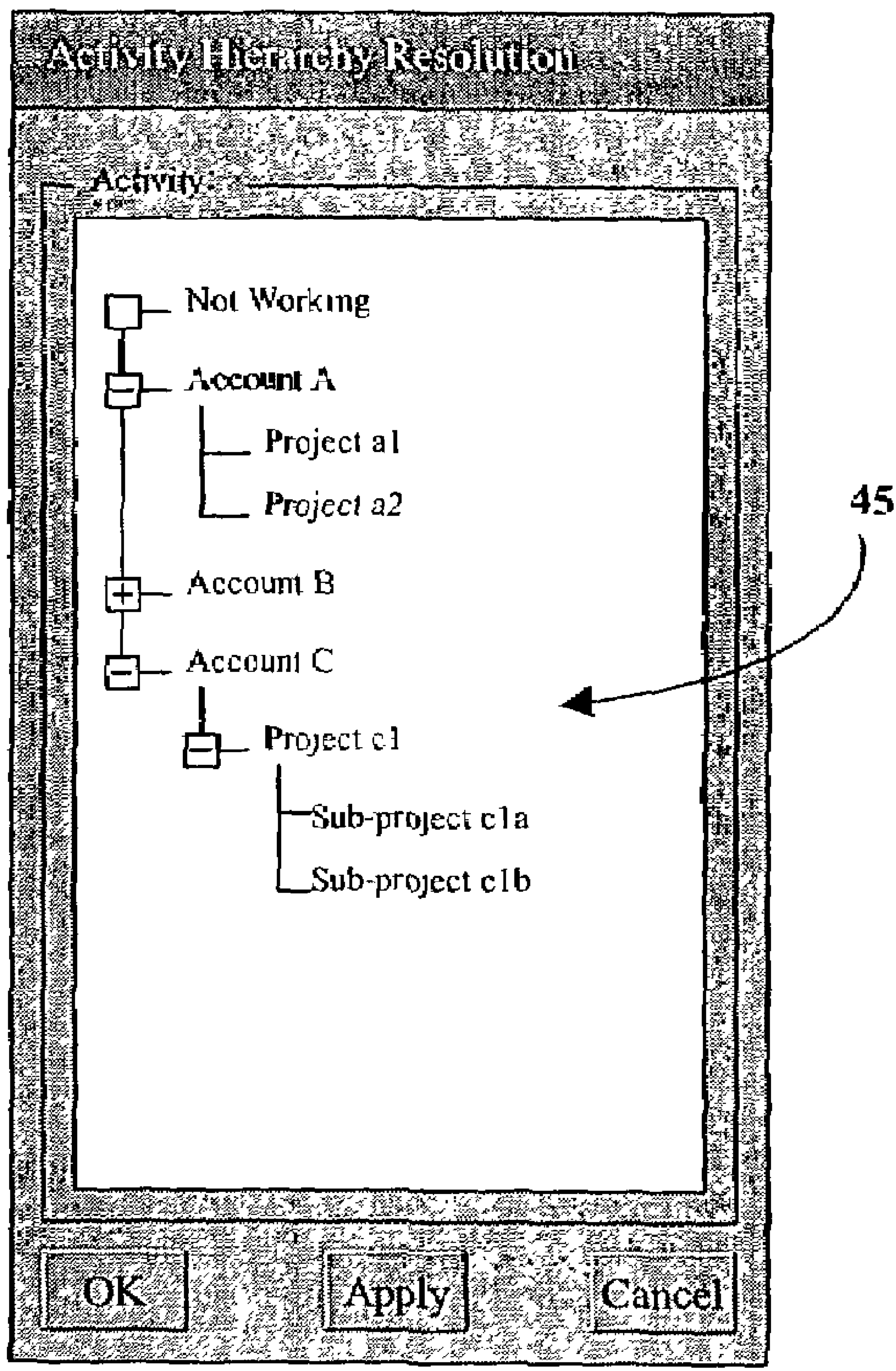
FIG. 14 shows one example of a dialog box that may control the display module's activity hierarchy resolution, according to an embodiment of the invention.

FIG. 14 shows one example of a dialog box that may be used to control the lowest level of the hierarchy used to display information on the display module's clock. The major component of the hierarchy resolution dialog may be the tree control 45 that displays the activity hierarchy. The levels of the activity hierarchy that are visible in the dialog may be the lowest levels displayed on the clock face. By expanding and contracting nodes of the tree, a user may increase and decrease the level of detail drawn on the clock face.

Figure 15:
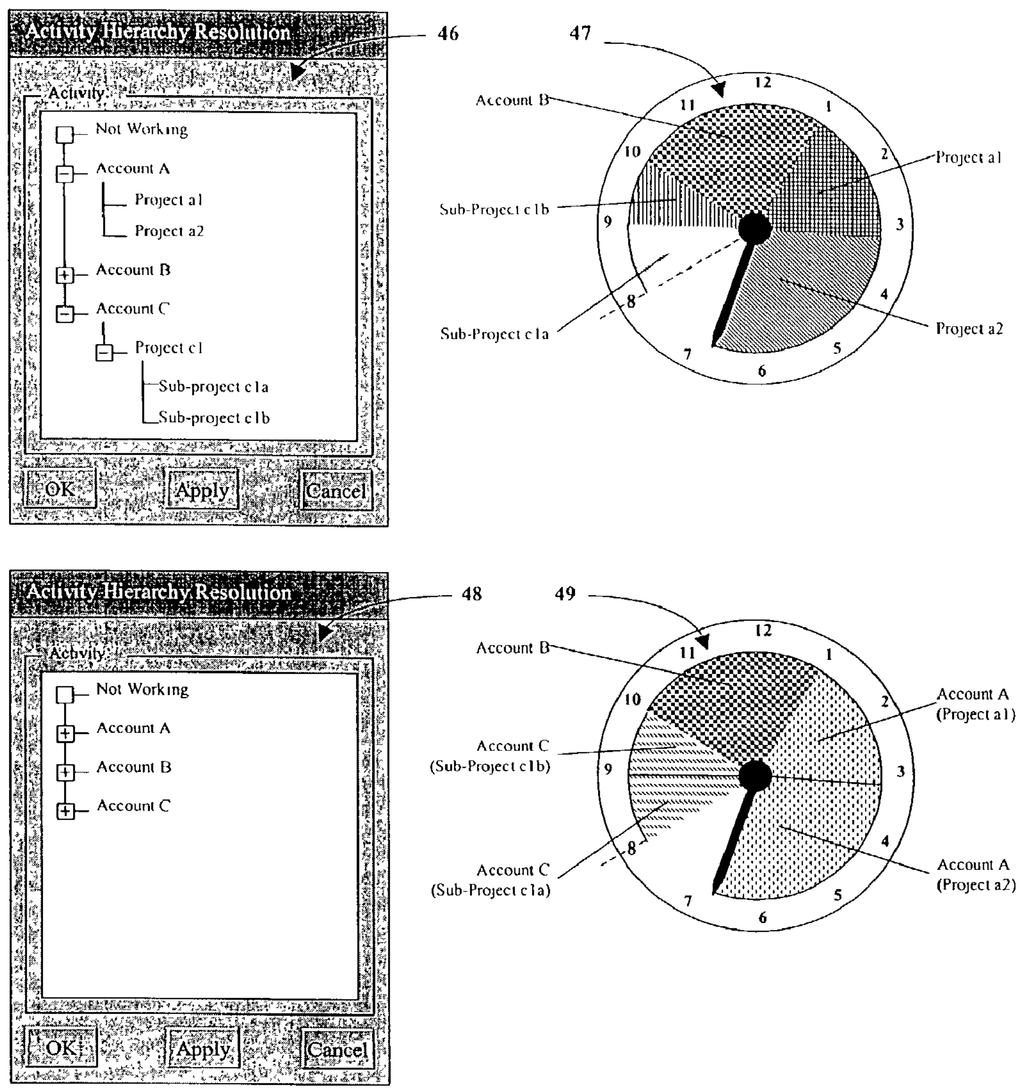
FIG. 15 illustrates the display module's clock face under two different hierarchy resolutions, according to an embodiment of the invention.

The two clock faces in FIG. 15 illustrate the same historical timing information in two levels of detail. Clock face 47 is drawn with the resolution specified in dialog 46. In dialog 46, most of the activity hierarchy is completely expanded. Consequently, the historical timing information on clock 47 may be presented in the most specific terms possible. In dialog 48 the activity hierarchy has been collapsed to its most general form. The corresponding clock, clock 49, may not be specific about the activities performed. For example, between 8:00 and 9:00, the user performed activity Sub-project c1*a*. Where clock 47 presents a one-hour wedge from 8:00 to 9:00 using the color of the Sub-project c1*a* activity, clock 49 uses the color of the grandparent task, Account C.

According to an embodiment of the invention, display module 7 may interact with activity control module 6, to enable a user to change the properties of the spans in the DSA by adjusting the size and placement of the colored regions on the face of the clock. Display module 7 may accomplish this by allowing a user to mark a span as selected by clicking on the corresponding region of the clock face with the left mouse button, or other suitable input device. When a span is selected, display module 7 may unselect the previously selected span (if there is one), draw the selected span in front of all other features on the clock face, attach resizing handles to the span's colored region, and display a span summary dialog. The details of in-clock span editing may be slightly different for each type of span. Examples of in-clock editing for each of the three span types are shown in FIG. 16.

Figure 16:
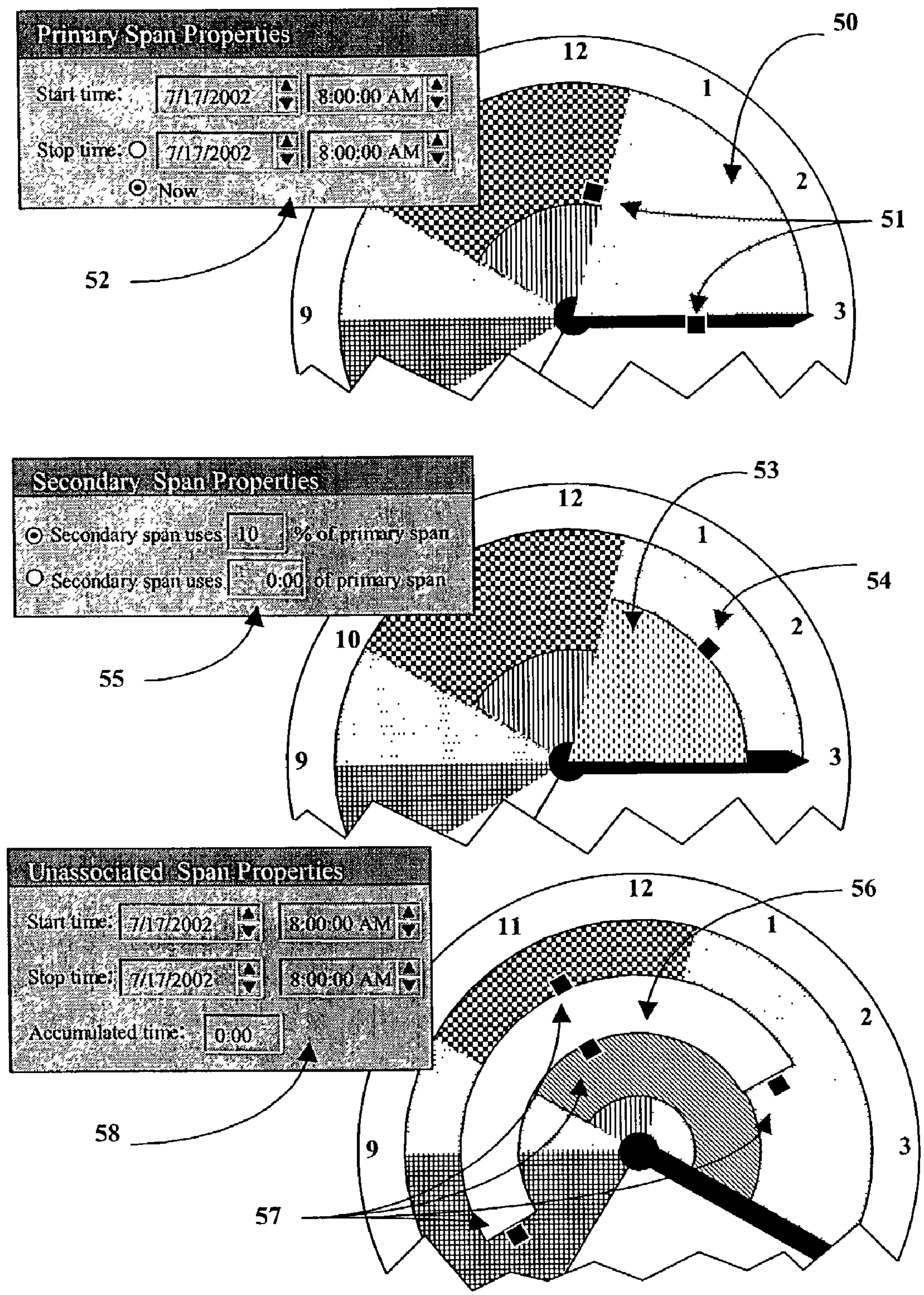
FIG. 16 is a sample illustration of the display module's span resizing controls, according to an embodiment of the invention.

FIG. 16 shows the results of selecting primary span 50. As seen in the figure, the span's colored region has been moved in front of all other objects on the display, including the clock hand. Resizing handles 51 have been added to the counterclockwise-most and clockwise-most edges of the wedge. Finally, the primary span summary dialog 52 has been invoked. With the primary span selected, a user may click and drag the resizing handles to change the start and stop time of the corresponding span. The resizing handles may only be moved along the edge of the circle whose center is the center of the clock, and whose radius is the distance to the resizing handle. This may ensure that the only aspects of the region that a user may alter are the positions of its starting and ending edges. The wedge may not be moved away from the center of the clock, and the radius of the circle of which the wedge is a part may not be shrunk or enlarged. The primary span summary dialog may be continuously updated as the region is resized to provide the user with feedback about the resize operation.

FIG. 16 also illustrates the results of selecting secondary span 53. Regions corresponding to secondary spans are given resizing handles 54 on their innermost and outermost edges. Since secondary span 53 may be the only secondary span for its primary, it is drawn as a wedge and has no innermost edge. According to an embodiment, a user may change the shape of the secondary span's region by clicking and dragging on its resize handles. Secondary span resizing handles may only be moved along the radial line that they sit on. This may ensure that the only aspects of a secondary span that a user may alter are the percent or accumulated time it occupies from the primary span. The secondary span summary dialog 55 may be continuously updated as the region is resized to provide the user with feedback about the resize operation.

Finally, FIG. 16 shows the results of selecting unassociated span 56. Regions corresponding to secondary spans may be given resizing handles 57 on both their counterclockwise-most and clockwise-most edges, as well as on their inner and outermost edges. Changes in position of the inner and outer resizing handles may translate to changes in the span's accumulated time. Changes in position of the handles on the sides of the region may translate to changes in the span's start and stop time. The unassociated span resizing dialog 58 may be continuously updated to provide the user with feedback about the resize operation.

Figure 17:
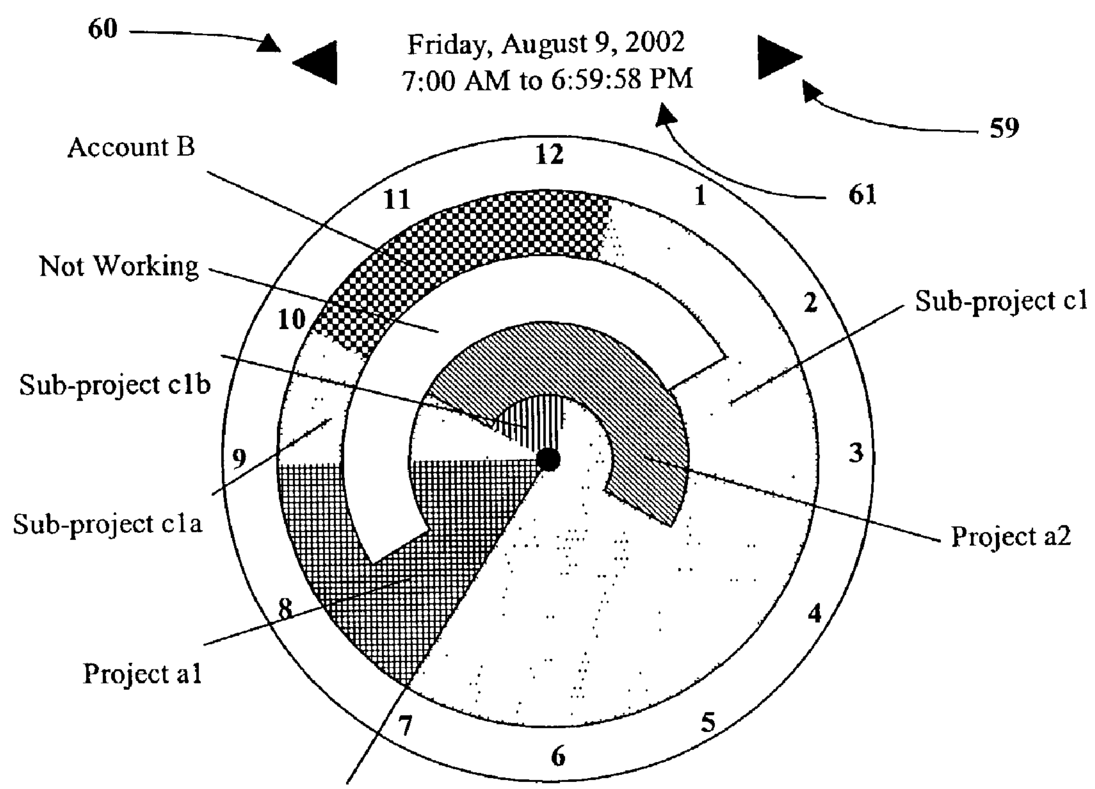
FIG. 17 illustrates a feature that allows a user to display historical timing information about activities that happened in prior 12 hour periods, according to an embodiment of the invention.

According to one embodiment of the invention, a user may be provided with the ability to view information about activities that occurred before the display module's start time. FIG. 17 shows one possible implementation of this enhancement. When viewing prior clocks, the display may render the clock face with no hour hand. The absence of an hour hand indicates that the clock does not show current information. The display module may further include a title 61 that describes the time period being displayed. The right facing arrow button 59 may advance the displayed time period 12 hours. The left facing arrow button 60 may cause the prior 12 hour period to be displayed.

Figure 18:
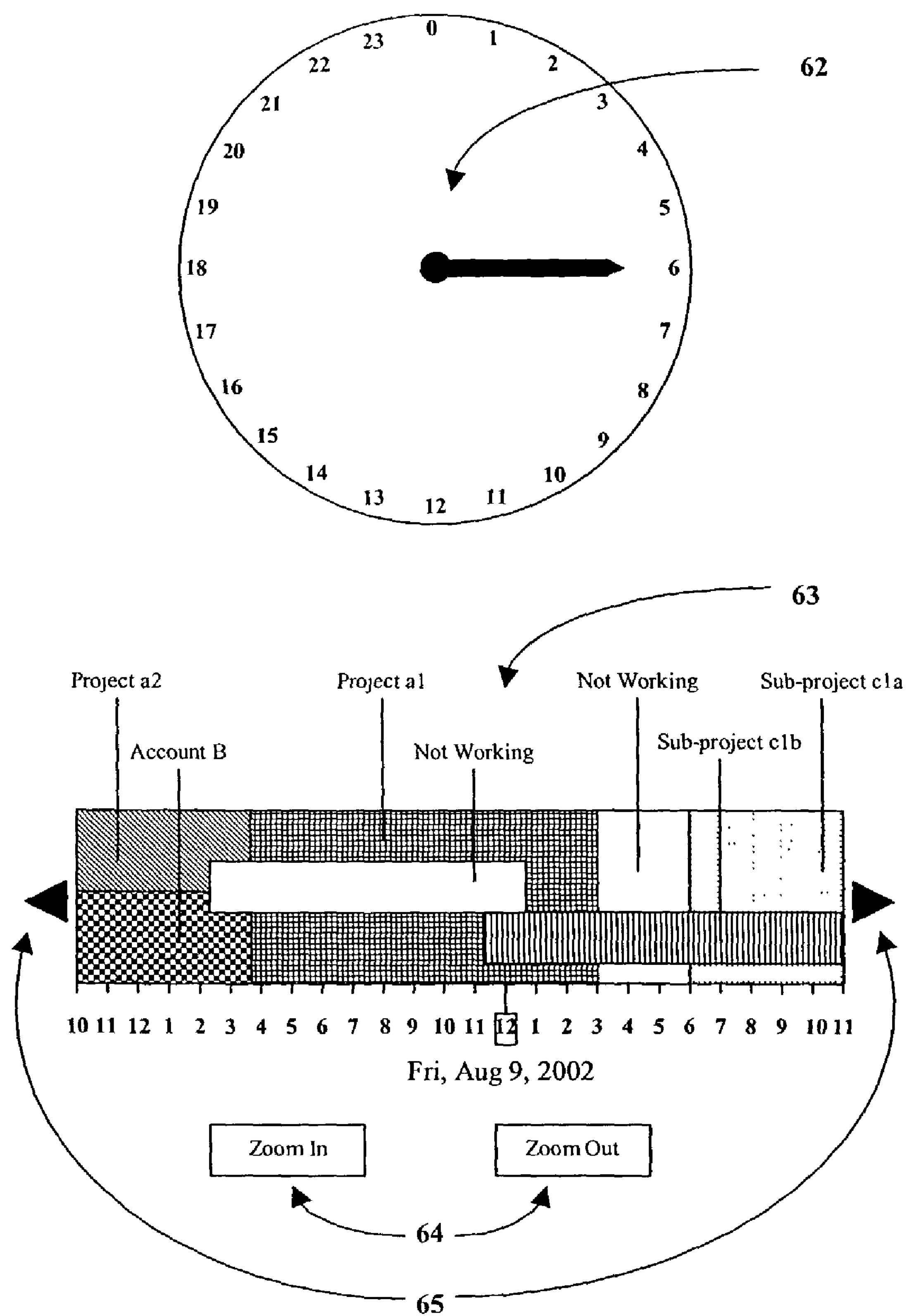
FIG. 18 illustrates alternatives to traditional clocks, according to an embodiment of the invention.

According to an embodiment of the invention, the application may be provided with the capability to display clocks that can display more than 12 hours of historical information at once. FIG. 18 illustrates examples of two such clocks. Clock 62 may display 24 hours, rather than 12 hours. Clock 63 may be thought of as a circular clock that has been "unrolled" into a rectangle. In addition to its nontraditional shape, clock 63 may display any arbitrarily long or short period of time. The Zoom In and Zoom Out buttons 64 at the bottom of the clock may be selected by a user to increase or decrease the time scale. When the pan buttons 65 to the left and the right of the clock face are pressed, the clock may display the previous or subsequent time periods.

Figure 23:
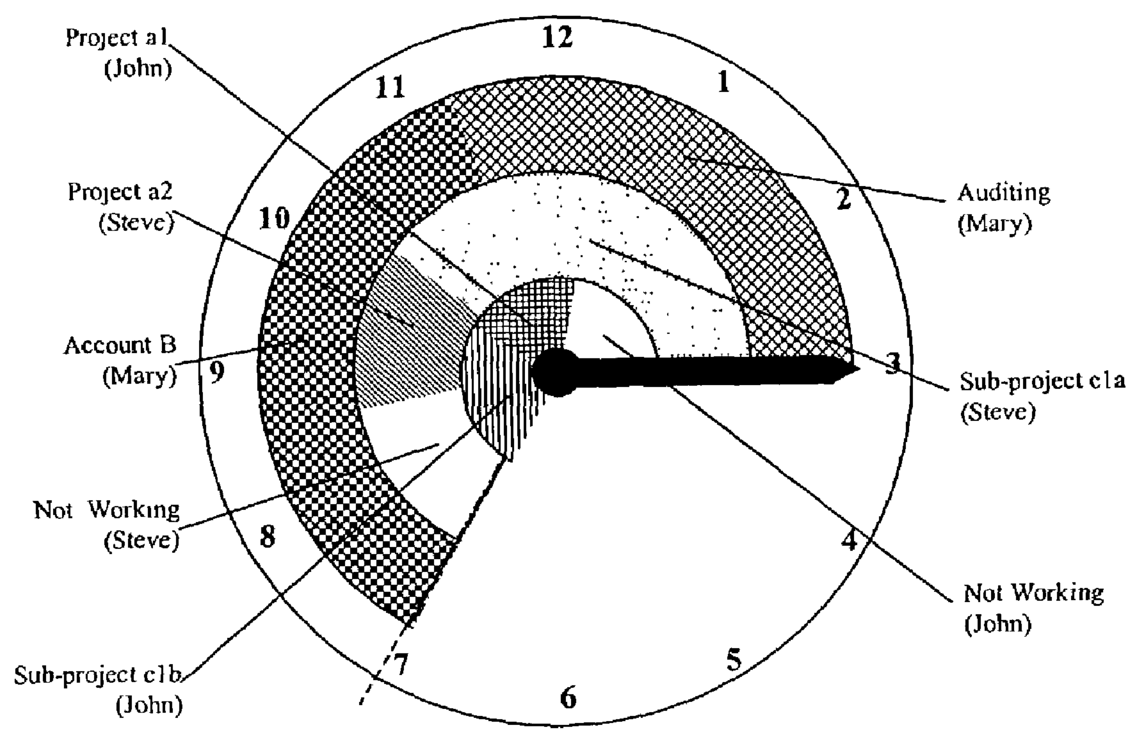
FIG. 23 shows an enhancement to the preferred embodiment that allows a supervisor to view the activities of multiple employees simultaneously, according to an embodiment of the invention.

According to an embodiment of the invention, the application may be provided with the capability to transmit information about span and activity hierarchy changes to a central instance of the application. The central, supervisor system may display information about the activities of multiple employees simultaneously. FIG. 23 shows how the activities of multiple employees may be rendered simultaneously on the face of a clock. The activities of three hypothetical employees, John, Steve and Mary, are shown in FIG. 23. Each employee is assigned to a concentric ring with the activities of each employee rendered within their own ring.

According to an embodiment of the invention, the report module 5 of the application may further comprise a report editor and a report generator.

The report editor may enable a user to specify the time periods and activities that will be the subjects of a report. The report editor may further comprise a user interface that allows the user to input the criteria for a report, and a storage unit that stores the user's report specifications in the DSA. Examples of report specifications may include, for example, tracking reports, list reports, and table reports.

Tracking reports may comprise queries whose answers may comprise a single piece of information. For instance, the questions "how much time did I spend on Account B today" or "How much time until the end of the shift" may translate into tracking reports because the answer is a single accumulated time (e.g. 4 hours).

A list report may comprise a query that yields a list of values. Answers to queries such as "list all of the activities I performed today and the amount of time I spent on each" can be computed by a list report.

Finally, a table report may comprise a query that yields a two-dimensional list of values. For example, the query "for each day of the week, list each activity that I performed and the amount of time I spent on it" would be expressed as a table report.

Additional types of report specifications may exist.

Figure 19:
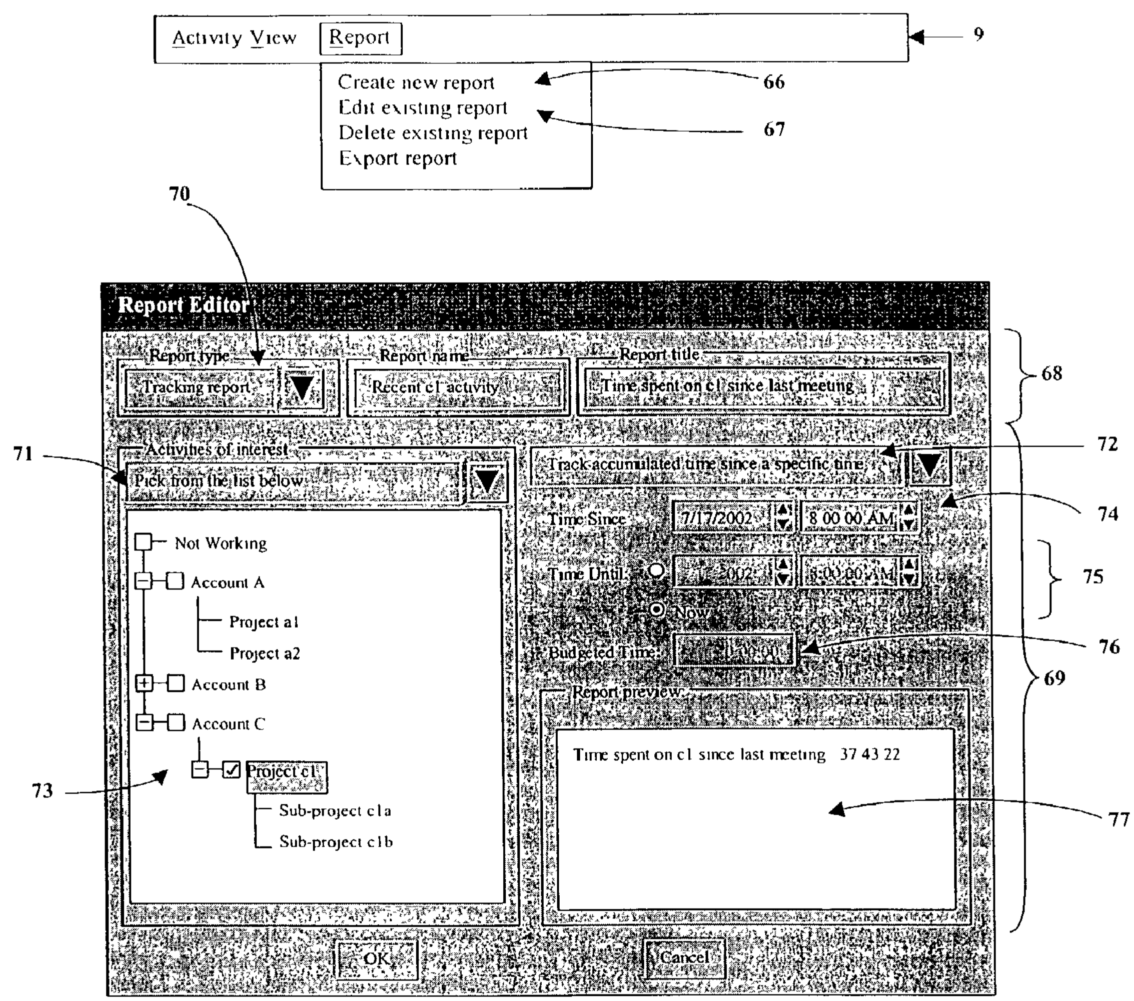
FIG. 19 depicts examples of the report module's menu items and dialog box, according to an embodiment of the invention.

The report editor and the main menu items related to the report module are shown in FIG. 19. The report editor may be invoked by selecting either the "Create Report . . . " or "Edit Report . . . " menu items 66 and 67. The report editor dialog may comprise a static section 68 and a dynamic section 69. The controls in the static section may remain constant no matter what the content of the report specification. The controls in the dynamic section, however, may depend on the type of report being edited.

According to an embodiment, when a user selects "Tracking report" from the Report type combo box 70, the controls in the dynamic section of the dialog may appear as shown in FIG. 19. The tracking report's dynamic controls may allow users to specify the quantity to be tracked and how that quantity will be computed.

The activity specification combo box 71 and the time period specification combo box 72 may control the type of value that will be computed for the report. Tracking reports may track, for instance, the amount of time spent on an activity or activities during a certain time period, the amount of budgeted time remaining for an activity or a set of activities, and the percentage of time spent on an activity or activities during a certain time period.

The activity specification combo box 71 enables users to choose from various activity specifications. For example, a user may select a specification entitled "All activities that are considered work." All activities that are considered work (i.e. the check box named "This activity is considered work" in FIG. 3 is checked) may be accounted for when computing the tracking report's value. A user may also select a specification entitled "All activities that are not considered work." In such an instance, only activities that are not considered work may be accounted for when computing the tracking report's value. Additionally, users may have the option to select a specification entitled "Pick activities from the list." When this selection is made in the activity specification combo box 71, the activity accounting control 73 may be enabled. Like the activity hierarchy control cluster 10, the activity accounting control may allow a user to expand and contract nodes in the activity hierarchy. However, unlike other activity controls, the activity accounting control 73 may enable users to choose multiple activities simultaneously. Furthermore, the activity accounting control 73 may be outfitted with check boxes next to each non-leaf activity. The parent activity checkboxes may control how accumulated time is computed for parent activities. If a node's parent activity checkbox is checked, the accumulated time of all of its child nodes may contribute to the node's accumulated time.

According to an embodiment, the time period specification combo box 72 may allow users to choose one of several possible time period specifications including, for example, tracking accumulated time since the start of the shift, since the start of the day, since the start of the work week, since the start of the calendar month, since the start of the calendar year, since the start of the pay period, since the first charge to the specified activities, and since a specific time, as well as track accumulated time in a specified period, track budgeted time remaining since the first charge, track budgeted time remaining since a specific time, and track percent of time in a specified period. Additional specifications may be provided.

If "Track accumulated time since the start of the shift" is chosen, the report generator may calculate the amount of time spent on the activities specified in the activity accounting control 73 since the start of the current work-shift, or the end of the previous shift (if there is no current shift). When this time period specification is selected, the Since controls 74, Until controls 75, and Budgeted time control 76 may be disabled to indicate that the application may automatically determine the time period targeted by the report.

If "Track accumulated time since the start of the day" is selected, this time period specification behaves like the "Track accumulated time since the start of the shift" specification, except that the targeted time period may extend from midnight of the current day until the present.

If "Track accumulated time since the start of the work week" is selected, this time period specification behaves like the "Track accumulated time since the start of the shift" specification, except that the targeted time period may extend from midnight of the first day of the current work week until the present.

If "Track accumulated time since the start of the calendar month" is selected, this time period specification behaves like the "Track accumulated time since the start of the shift" specification, except that the targeted time period may extend from midnight of the first day of the current calendar month until the present.

If "Track accumulated time since the start of the calendar year" is selected, this time period specification behaves like the "Track accumulated time since the start of the shift" specification, except that the targeted time period may extend from midnight of the first day of the current calendar year until the present.

If "Track accumulated time since the start of the pay period" is selected, this time period specification behaves like the "Track accumulated time since the start of the shift" specification, except that the targeted time period may extend from midnight of the first day of the current pay period until the present.

If "Track accumulated time since the first charge to the specified activities" is selected, the report generator may calculate the amount of time spent on the activities specified in the activity accounting control 73 since the first charge to any of the activities. When this time period specification is selected, the Since controls 74, Until controls 75 and Budgeted time control 76 may be disabled to indicate that the software may automatically determine the time period targeted by the report.

If "Track accumulated time since a specific time" is selected, the report generator may calculate the amount of time spent on the activities specified in the activity accounting control 73 since the time specified in the Since control 74. When this time period specification is selected, the Since controls 74 are enabled, but the Until controls 75 and Budgeted time control 76 may be disabled.

If "Track accumulated time in a specified period" is selected, the report generator calculates the amount of time spent on the activities specified in the activity accounting control 73 between the times specified by the Since controls 74 and the Until controls 75. When this time period specification is selected, the Since controls 74 and the Until controls 75 are enabled, but the Budgeted time control 76 may be disabled.

If "Track budgeted time remaining since the first charge" is selected, the report generator calculates the difference between the amount of time specified in the Budgeted time control 76 and the time accumulated by all of the specified activities since the first charge to any of the activities. When this time period specification is selected, the Since controls 74 and the Until controls 75 may be disabled.

If "Track budgeted time remaining since a specific time" is selected, the report generator may calculate the difference between the amount of time specified in the Budgeted time control 76 and the time accumulated by all specified activities between the times specified by the Since controls 74 and the Until controls 75.

If "Track percent of time in a specified period" is selected, the report generator may calculate the percent of the time between the times specified by the Since controls 74 and the Until controls 75 that the user spent performing the activities specified in the activity accounting control 73.

As a user changes the selections and values in the various controls that specify the tracking report, the report preview pane 77 may display the report generator's output for the current report settings.

Figure 20:
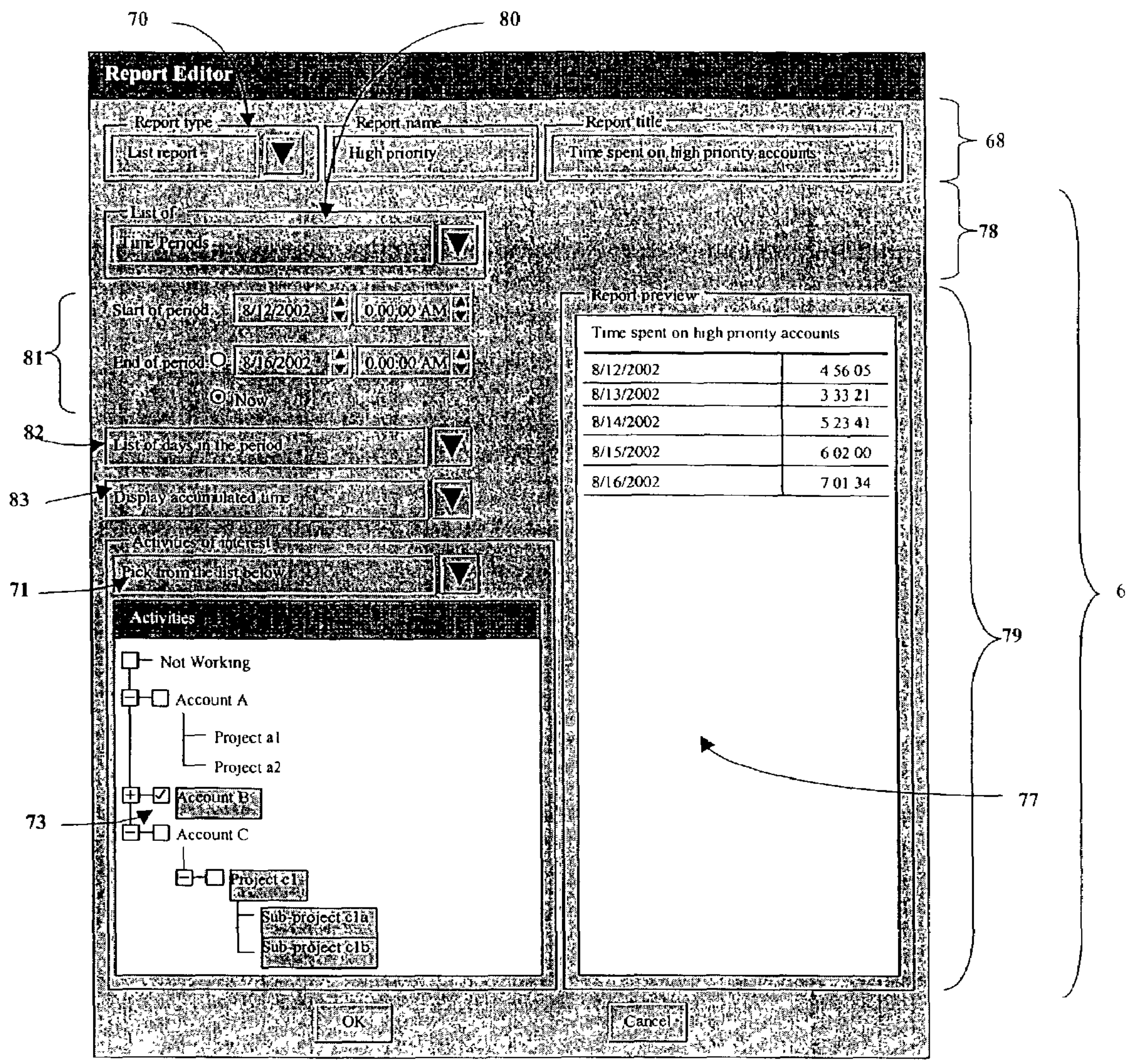
FIG. 20 shows the report editor dialog displaying the specification for a time-period based list report, according to an embodiment of the invention.
Figure 21:
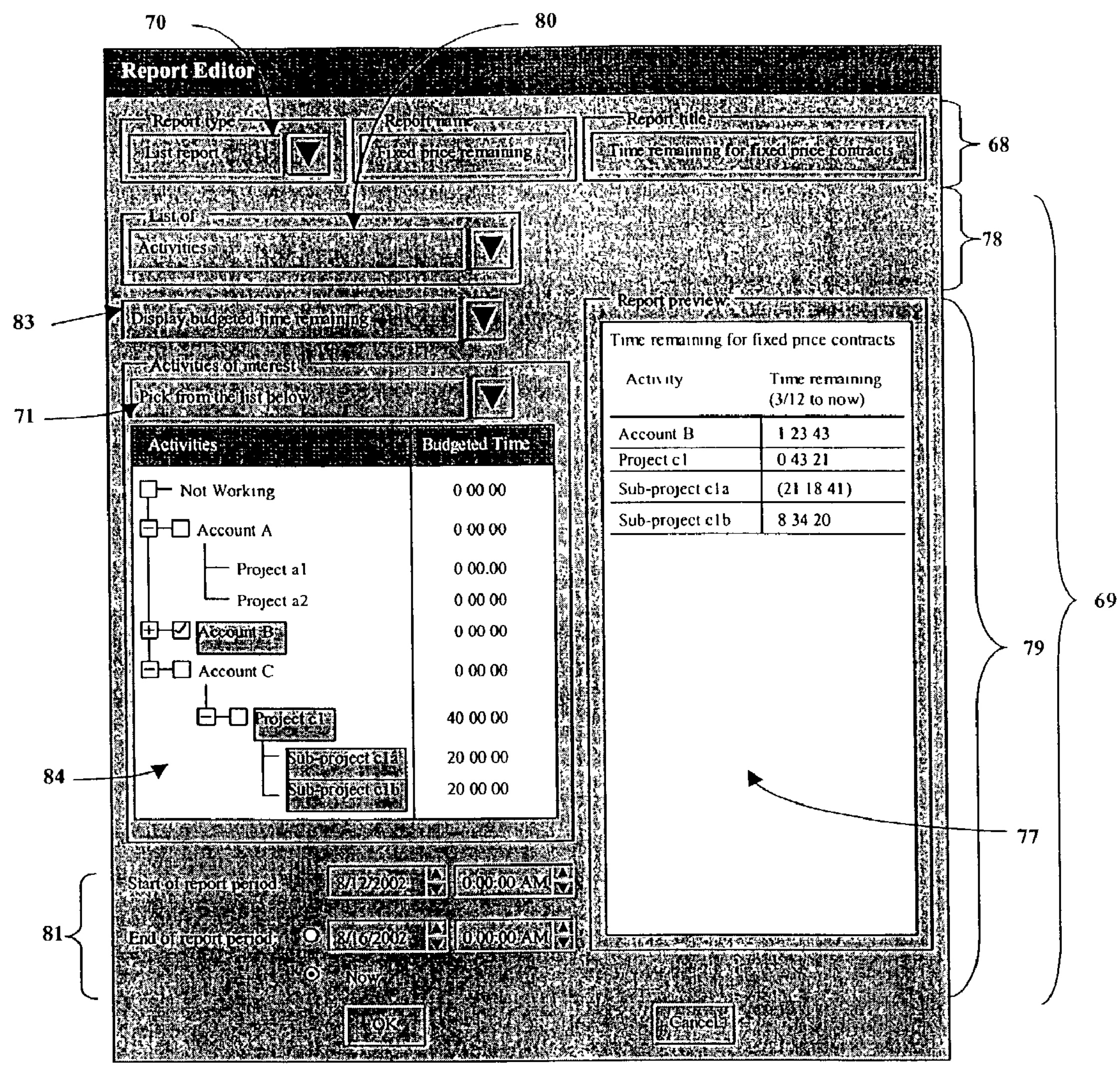
FIG. 21 shows the report editor dialog displaying the specification for an activity-based list report, according to an embodiment of the invention.

According to an embodiment of the invention, when a user selects "List report" from the "Report type" combo box 70, the controls in the dynamic section of the dialog may appear as shown in FIG. 20 or 21. Two types of list reports may be generated: lists of activities and lists of time periods. The "List of" control 80 allows the user to specify the type of list that the report may generate. When the user is creating a list report, the dynamic section of the Report editor 69 itself may consist of static 78 and dynamic 79 sections. The controls displayed in dynamic section 79 may depend on the type of list report —"List of activities" or "List of time periods".

FIG. 20 shows a report editor dialog displaying the specification of a period-based list report. The dynamic section 79 comprises a set of duration controls 81, a time-period resolution control 82, a table cell content picker 83, an activity specification combo box 71, an activity accounting control 73, and a report preview control 77. The duration controls 81 enable users to specify the time span that the period-based list report may cover. The time period resolution control 82 may determine the time span covered by each row of the table. The time period resolution control 82 allows the user to pick one value from the group consisting of: List of hours in the period, List of shifts in the period; List of days in the period; List of weeks in the period; List of pay periods in the period; List of months in the period; and List of years in the period. Other values may be provided.

According to an embodiment of the invention, the table cell content picker 83 may allow a user to choose the type of quantity that will be computed in each row of the table. The table report may contain various types of quantities including, for example, accumulated time and percent of time in the period.

According to an embodiment of the invention, the report preview control 77 may display the list report generated using the report editor dialog's current settings. For time-period based list reports, the report preview control may display a vertical list with two columns, although additional presentation formats may be utilized. The first column may describe the time period accounted for by each row. The second column may contain the computed quantity for each time period.

FIG. 21 shows a report editor dialog displaying the specification of an activity-based list report. The dynamic section 79 comprises a table cell content picker 83, an activity specification combo box 71, an activity accounting control with a budget column 84, a set of duration controls 81 and a report preview control 77.

The table cell content picker 83 enables a user to pick one or more various quantities to fill the list report including, for example, Display accumulated time, Display budgeted time remaining, and Display percent of duration.

The activity accounting control with a budget column 84 behaves much like the activity accounting control 73. However, for the activity-based list report, a column may be added that enables a user to enter an amount of budgeted time for each activity. The budgeted time may be used to calculate the values in the list report when the user has specified that each list row display the budgeted time remaining.

According to an embodiment of the invention, the duration controls 81 may govern the span of time considered by the report. The report preview control 77 may display the list report generated using the report editor dialog's current settings. For activity based list reports, the report preview control may display a list with two columns, although other presentation formats may be utilized. The first column may contain the name of one of the activities targeted by the report, while the second column may contain the value computed for each activity.

Figure 22:
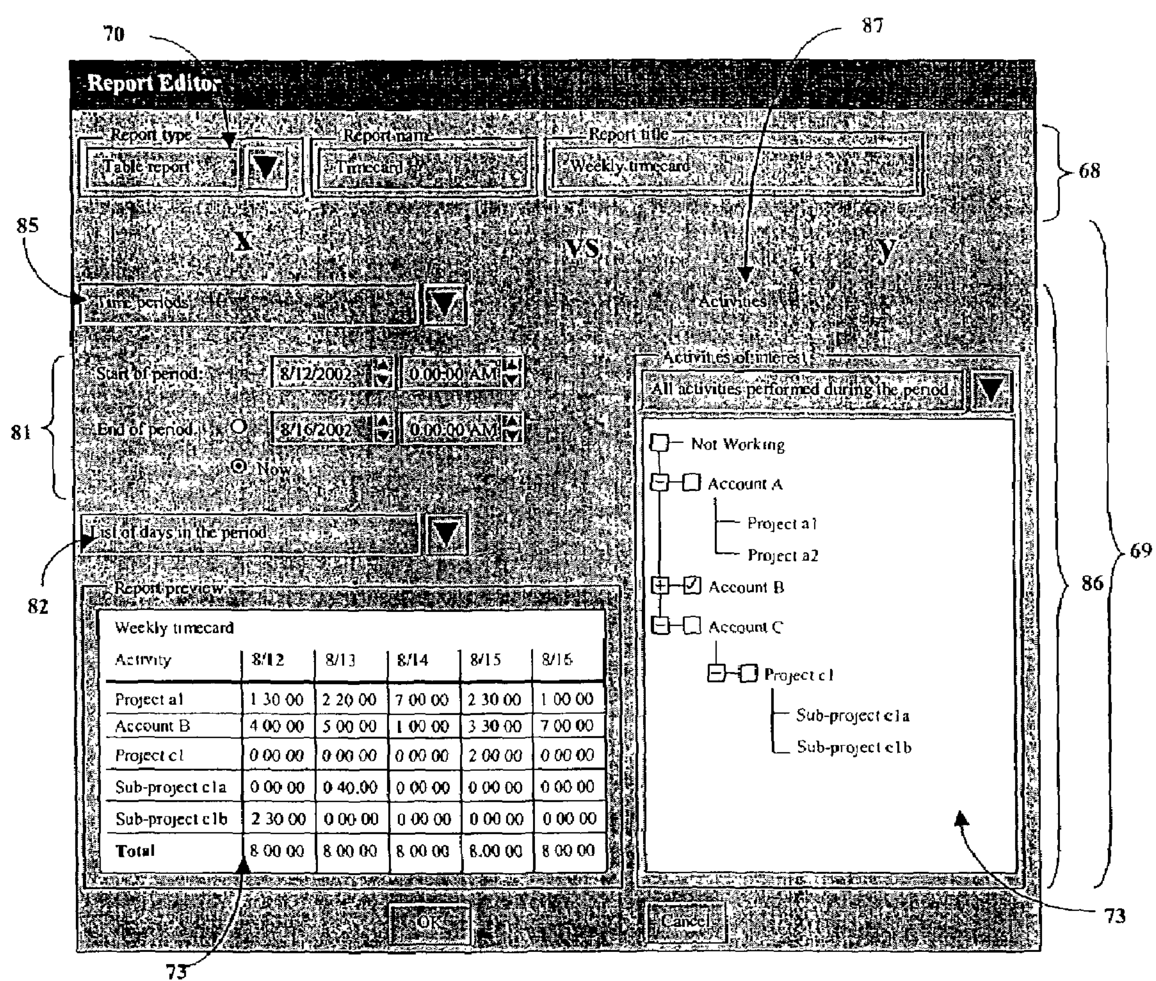
FIG. 22 shows the report edit dialog displaying the specification for a table-based report, according to an embodiment of the invention.

According to an embodiment of the invention, when the user selects "Table report" from the "Report type" combo box 70, the controls in the dynamic section of the dialog may appear as shown in FIG. 22. The dynamic portion of the dialog box may be divided into three sets of controls: the controls that specify the meaning of the table's x-axis, the controls that display the meaning of the report's y-axis, and a report preview control 77. The dynamic portion of the report editor 69 itself may consist of static and dynamic portions.

The x-axis picker 85 may control the meaning of the table report's x axis. This control enables a user to pick one of two values. The two values may, according to an embodiment, comprise "Activities", and "Time Periods." When a user chooses "Activities" to be on the table report's x-axis, the report editor may arrange the controls in the lower portion of the dialog 86 so that the controls that dictate which activities may be included in the report are located on the left side of the dialog. When "Activities" is the chosen for the x-axis, the y-axis designator 87 may display the text "Time periods".

By contrast, when a user chooses "Time periods" to be on the table report's x-axis, the report editor may arrange the controls in the lower portion of the dialog 86 so that the controls that dictate which time periods may be included in the report are located on the left side of the dialog. When "Time periods" is chosen for the x-axis, the y-axis designator 87 may display the text "Activities".

According to an embodiment of the invention, the duration controls 81, the time period resolution control 82, and activity accounting control 73 behave as they do for the list and tracking reports.

According to an embodiment of the invention, the report generator may read report specifications from the DSA, and either display the required information on the screen, or export the information to a file or other software application. When displaying report information on the screen, the report generator may update the on-screen data in real-time. As spans accumulate time or are changed due to user edits, the report generator may consistently update the on-screen data to reflect the current state of the span lists.

According to an embodiment, the report generator may be used to populate the report pane 3 with report information.

As seen in FIG. 2, the report generator may display more than one report at a time. When the user presses the "Add Report . . . " button 88, he or she may be presented with a list of the report specifications stored in the DSA. The report generator may add to the report pane any reports the user picks from the list.

In alternative embodiments of the invention, the report generator may be used to integrate the application with an external billing system. Many billing systems gather information on the users' activities on a daily or weekly basis, rather than harvesting them in real-time as the users perform work. Once information on the day's or week's activities is submitted to the billing system, users may typically not edit or alter the submitted spans.

Figure 24:
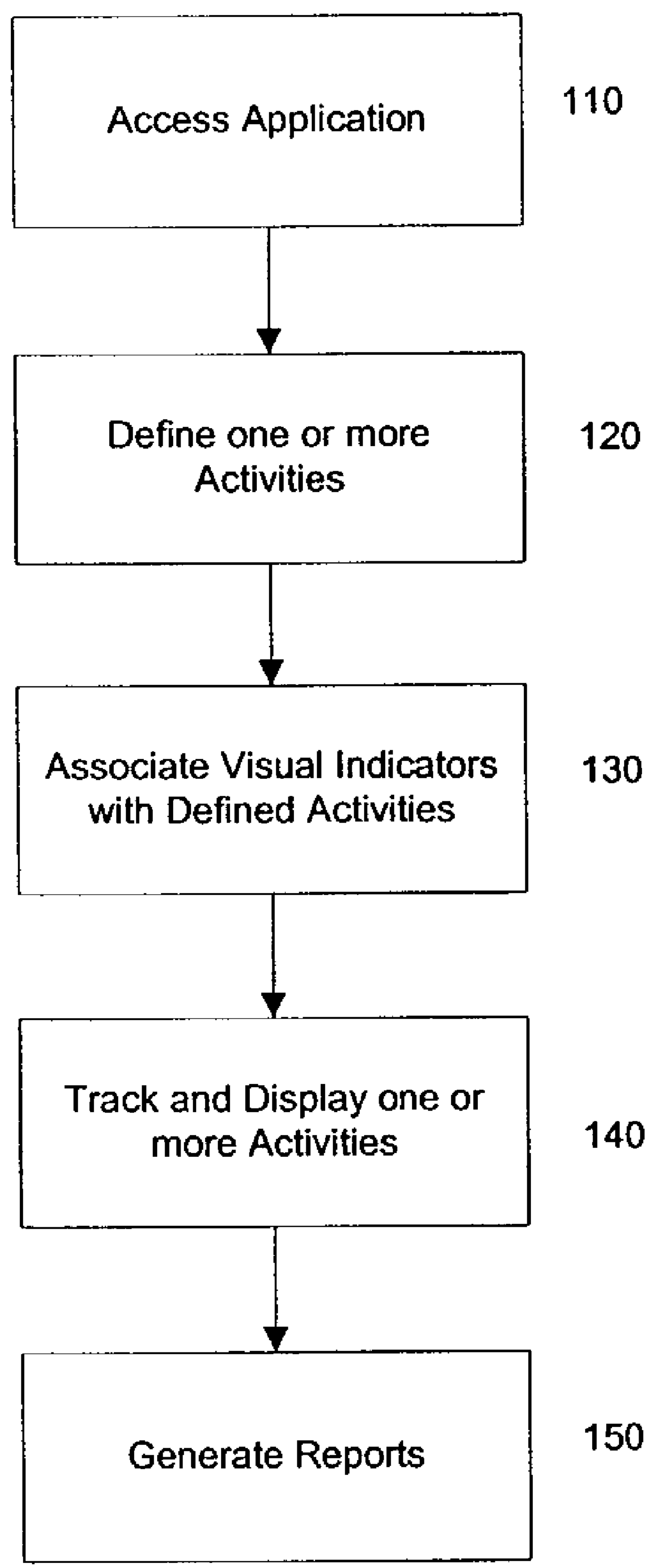
FIG. 24 illustrates a flowchart of processing according to the invention, in one regard.

FIG. 24 illustrates a flowchart of processing according to the invention, in one regard. In an operation 110, a user may access an application that comprises a portion of a a Timekeeping System and Method for Graphically Tracking and Representing Activities. According to an embodiment of the invention, the application may comprise one or more modules, including for example, an activity control module, a display module, and a report module.

According to one embodiment, the application may comprise a stand-alone software application, or may be incorporated into a separate, existing software application (e.g., an electronic billing application). As described in detail above, the application may be stored on a hard drive of a computer, or stored on removable media that may be required to be present in a media reader associated with the computer for the application to run. The application may also be stored on any number of suitable devices as recited above with reference to FIG. 1. In an alternative embodiment, a network server may host the application, thus requiring a user, in operation 110, to access the server over a network to utilize the application.

In an operation 120, a user may define a plurality of activities that may be performed. This functionality may be enabled, according to one embodiment, by the activity control module. According to an embodiment of the invention, a user (e.g., an employee) may access the application and input various activity names and charge numbers which correspond to the activity names. The term "activity" has been previously defined to encompass any task, project, event, client, matter, or other definable occurrence for which an employee may (or may not) perform work. According to various other embodiments, the activity control module may already include one or more pre-defined activity names or charge numbers, or an employer may first input any or all activity names and charge numbers that any employee may be expected to use.

In an operation 130, a user may associate a visual indicator with each activity defined in operation 120. Examples of suitable visual indicators may include, but are not limited to, color, shades of a particular color, differing textures, patterns, pictures, degrees of luminescence or transparency, animated scenes, and numbers or words.

The activity control module may then generate and display a color-coded selection mechanism (e.g., button) for each activity that a user enters. The colors displayed on the activity buttons correspond to the color associated with the button's activity. The activity control module may also display one or more additional selection mechanisms (or buttons) associated with various built-in activities named, for example, "Not Working," or "Lunch Break." Various other selection mechanisms may be presented.

In an operation 140, the activity control module may also enable a user to indicate when he or she commences performing a particular activity, or when a particular activity begins to occur, and when it ends. Moreover, in operation 140, the display module may enable regions of a face of a clock to be filled with color to provide a visual indication of activities that have actually occurred. The counterclockwise-most extent of each region may, for example, correspond to the start time of one or more activities, while the clockwise-most extent of each region may correspond to the stop time of the activity or activities to which the region corresponds.

According to an embodiment, various other features and functionalities may be afforded to users in operation 140. Returning to the example of how an employee may use the application to record time at work, an employee may, when commencing work on an activity, press or select the activity button corresponding to a charge number to be used for that activity. Each of the three software modules may respond to this action. The activity control module may, for example, display the selected activity button as depressed. The report generator may update information about the amount of time charged to the selected charge number at a desired increment (e.g., seconds, minutes, or multiples thereof). The display module may display a clock face. The hour hand of the clock face may begin to deposit color on the clock face behind it as it moves. The color deposited is the color associated with the selected activity.

According to an embodiment, in operation 140, when an employee begins working on a task whose time is to be charged to a different charge number, he or she may press an activity button for the new task. In response, the activity control module may now display the previously selected activity button as un-depressed, and display the most recently selected button as depressed. The report generator may continue to update the report information at a desired increment. The hour hand of the clock face (displayed by the display module) may begin to deposit the color associated with the newly selected activity behind it as it moves.

An employee may select (or press) the "Not Working" activity button (or other designated selection mechanism) to indicate when, he is no longer working on a task, is taking a break, or has ceased work for the day. The "Not Working" activity may be associated with a color that is the same color as the background of the face of the display module's clock.

By the end of a work day, the display module's clock may be covered with wedge-shaped sections of color providing a graphical summary of the day's activities. If an employee is interested in viewing information about the time charged to each charge number or the total time worked, he or she may access the report editor to submit a query for the desired information.

According to an embodiment, in operation 140, an employee may wish to record that he is simultaneously engaged in multiple activities, such as performing work that is to be charged to several different accounts, or because he is switching between several tasks so frequently that it is not practical to record every transition from one activity to another. In these situations, the employee may invoke a dialog box from the activity control module that allows him to describe which activities are occurring in parallel, as well as how his time should be allocated between the activities.

According to an embodiment, in operation 140, when an employee is performing multiple activities at the same time, the hour hand may deposit multiple colors behind it as it moves. These colors may correspond to the colors of the activities that are happening simultaneously, and may form a rainbow-like arrangement of concentric bands on the face of the clock. The width of each band may correspond to the amount of time the employee is allocating to each activity.

In an operation 150, a user (e.g., employee) may generate various reports, using the report module, to account for and/or summarize the time that they have spent on various activities. The report module may, in certain implementations, further comprise a report editor and/or a report generator. A user may use the report editor to specify for which activities or time periods he or she would like to display information. The report module's report generator may display information about the activities or time periods of interest, and may further update the displayed information in real-time. The report module may also export timing information in various formats that may be read by other software packages. In some embodiments, the report module may be part of (or may be integrated with) an electronic billing system.

It should be recognized that the foregoing description of the various operations depicted in FIG. 24 is not limiting. Other operations may be performed, and additional features and functionalities may be implemented or made available to users during the operations described.

Moreover, other embodiments, uses, and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of graphically tracking and representing one or more activities performed by a user over a period of time, the method comprising:

enabling a user to define at least one activity to be performed by the user for which the user desires to track a duration of performance;

enabling the user to select a visual indicator to be associated with the at least one activity, the visual indicator comprising at least one of a color or a pattern;

providing a selection mechanism, that is associated with the selected visual indicator, that the user can select when commencing performance of the at least one activity; and providing a graphical display of a clock face on which the visual indicator is illustrated so as to indicate performance of the at least one activity by the user as it occurs in real-time, wherein a dimension of the visual indicator illustrated on the clock face graphically represents the duration of performance of the at least one activity by the user over a period of time.

2. The method of claim 1, wherein the clock face displays a 12-hour time period.

3. The method of claim 1, wherein the clock face displays a 24-hour time period.

4. The method of claim 1, wherein the visual indicator comprises a color, and wherein the selection mechanism is coded with the color.

5. The method of claim 1, further comprising:

enabling the user to de-select the selection mechanism when ceasing performance of the at least one activity.

6. The method of claim 4, wherein the clock face has an hour hand, and the dimension comprises an arc of the color that is swept out by the hour hand for the period of time over which the at least one activity is performed by the user, further comprising:

displaying, when the selection mechanism is selected, the arc of color by sweeping the arc of color out by the hour hand of the clock face in real time to represent the elapsed time of performance of the at least one activity by the user.

7. The method of claim 1, wherein the visual indicator comprises a color, the clock face has an hour hand, and the dimension comprises an arc of the color that is swept out by the hour hand for the period of time over which the at least one activity is performed by the user.

8. The method of claim 7, wherein the arc of color is swept out by the hour hand of the clock face in real time to represent the elapsed time of performance of the at least one activity by the user.

9. The method of claim 7, wherein a counterclockwise-most extent of the arc corresponds to commencement of performance of the at least one activity, and a clockwise-most extent of the arc corresponds to cessation of performance of the at least one activity.

10. The method of claim 1, further comprising:

providing a Daylight Saving Time (DST) transition scheme for each distinct geographical time zone, thus enabling display of an appropriate clock face during a transition to or from Daylight Saving Time.

11. The method of claim 1, further comprising:

providing a report generator to enable users to display information relating to the at least one activity.

12. The method of claim 1, wherein the at least one activity comprises a plurality of activities and wherein the clock face has an hour hand, further comprising:

enabling the user to display multiple visual indicators over a single period of time when the activities corresponding to the respective visual indicators are performed simultaneously.

13. The method of claim 12, wherein the multiple visual indicators comprise multiple colors, and wherein the dimension comprises an arc of multiple colors that is swept out by the hour hand for the single period of time over which the plurality of activities are performed.

14. The method of claim 13, further comprising:

enabling a user to display a dialog box associated with the arc of multiple colors, wherein the dialog box includes a description of a function used to allocate portions of the single period of time to the plurality of activities.

15. The method of claim 1, further comprising:

enabling the user to specify that the visual indicator represents a categorization of the at least one activity; and enabling the user to control the resolution of the categorization.

16. A system for graphically tracking and representing one or more activities performed by a user over a period of time, the system comprising:

means for enabling a user to define at least one activity to be performed by the user for which the user desires to track a duration of performance;

means for enabling the user to select a visual indicator to be associated with the at least one activity, the visual indicator comprising at least one of a color or a pattern;

means for providing a selection mechanism, that is associated with the visual indicator, that the user can select when commencing performance of the at least one activity; and means for providing a graphical display of a clock face on which the visual indicator is illustrated so as to indicate performance of the at least one activity by the user as it occurs in real-time, wherein a dimension of the visual indicator illustrated on the clock face graphically represents the duration of performance of the at least one activity by the user over a period of time.

17. The system of claim 16, wherein the clock face displays a 12-hour time period.

18. The system of claim 16, wherein the clock face displays a 24-hour time period.

19. The system of claim 16, wherein the visual indicator comprises a color, and wherein the selection mechanism is coded with the color.

20. The system of claim 16, wherein de-selection of the selection mechanism by the user indicates cessation of performance of the at least one activity.

21. The system of claim 19, wherein the clock face has an hour hand, and the dimension comprises an arc of the color that is swept out by the hour hand for the period of time over which the at least one activity is performed by the user, further comprising:

means for displaying, when the selection mechanism is selected, the arc of color by sweeping the arc of color out by the hour hand of the clock face in real time to represent the elapsed time of performance of the at least one activity by the user.

22. The system of claim 16, wherein the visual indicator comprises a color, the clock face has an hour hand, and the dimension comprises an arc of the color that is swept out by the hour hand for the period of time over which the at least one activity is performed by the user.

23. The system of claim 22, wherein the arc of color is swept out by the hour hand of the clock face in real time to represent the elapsed time of performance of the at least one activity by the user.

24. The system of claim 22, wherein a counterclockwise-most extent of the arc corresponds to commencement of performance of the at least one activity, and a clockwise-most extent of the arc corresponds to cessation of performance of the at least one activity.

25. The system of claim 16 further comprising means for providing a Daylight Saving Time (DST) transition scheme for each distinct geographical time zone, thus enabling display of an appropriate clock face during a transition to or from Daylight Saving Time.

26. The system of claim 16, further comprising a report generator to enable users to display information relating to the at least one activity.

27. The system of claim 16, wherein the at least one activity comprises a plurality of activities and wherein the clock face has an hour hand, further comprising:

means for enabling the user to display multiple visual indicators over a single period of time when the activities corresponding to the respective visual indicators are performed simultaneously.

28. The system of claim 27, wherein the multiple visual indicators comprise multiple colors, and wherein the dimension comprises an arc of multiple colors that is swept out by the hour hand for the single period of time over which the plurality of activities are performed.

29. The system of claim 28, further comprising means for enabling a user to display a dialog box associated with the arc of multiple colors, wherein the dialog box includes a description of a function used to allocate portions of the single period of time to the plurality of activities.

30. The system of claim 16, further comprising:

means for enabling the user to specify that the visual indicator represents a categorization of the at least one activity; and means for enabling the user to control the resolution of the categorization.

31. An article of manufacture for graphically tracking and representing activities performed by a user over a period of time, the article of manufacture comprising:

at least one processor readable medium; and instructions carried on the at least one medium;

wherein the instructions are configured to be readable from the at least one medium by at least one processor and thereby cause the at least one processor to operate so as to:

enable a user to define at least one activity to be performed by the user for which the user desires to track a duration of performance;

enable the user to select a visual indicator to be associated with the at least one activity, the visual indicator comprising at least one of a color or a pattern;

provide a selection mechanism, that is associated with the selected visual indicator, that the user can select when commencing performance of the at least one activity; and provide a graphical display of a clock face on which the visual indicator is illustrated so as to indicate performance of the at least one activity by the user as it occurs in real-time, wherein a dimension of the visual indicator illustrated on the clock face graphically represents the duration of performance of the at least one activity by the user over a period of time.

* * * * *